US012540962B2

United States Patent
Amin et al.

(10) Patent No.: US 12,540,962 B2
(45) Date of Patent: *Feb. 3, 2026

(54) COMPLEX DIELECTRIC CONSTANT SENSING SYSTEM AND METHOD

(71) Applicant: Taibah University, Medina (SA)

(72) Inventors: Muhammad Amin, Madinah (SA); Hattan F. Abutarboush, Madinah (SA); Rashad Ramzan, Islamabad (PK); Omar F. Siddiqui, Madinah (SA); Aqsa Ehsan, Islamabad (PK)

(73) Assignee: Taibah University, Madinah (SA)

( * ) Notice: Subject to any disclaimer, the term of this patent is extended or adjusted under 35 U.S.C. 154(b) by 347 days.

This patent is subject to a terminal disclaimer.

(21) Appl. No.: 18/472,191

(22) Filed: Sep. 21, 2023

(65) Prior Publication Data

US 2025/0102551 A1    Mar. 27, 2025

(51) Int. Cl.
G01R 27/26 (2006.01)
F16D 3/223 (2011.01)
G01N 22/00 (2006.01)

(52) U.S. Cl.
CPC ......... G01R 27/2664 (2013.01); G01N 22/00 (2013.01); F16D 3/223 (2013.01); F16D 2003/22303 (2013.01)

(58) Field of Classification Search
CPC .... G01R 27/2664; G01R 27/06; G01R 27/28; G01R 31/11; G01N 22/00; F16D 2003/22303; F16D 3/223

(Continued)

(56) References Cited

U.S. PATENT DOCUMENTS

2003/0016176 A1* 1/2003 Kingsley ............... H01Q 21/22
343/700 MS
2015/0168314 A1* 6/2015 El Matbouly .......... G01N 15/06
324/633

(Continued)

OTHER PUBLICATIONS

Alahnomi et al.,"Review of Recent Microwave Planar Resonator-Based Sensors: Techniques of Complex Permittivity Extraction, Applications, Open Challenges and Future Research Directions," Sensors, vol. 21, No. 7, p. 2267, 2021 (38 pages).

(Continued)

*Primary Examiner* — Raul J Rios Russo
(74) *Attorney, Agent, or Firm* — MUGHAL GAUDRY & FRANKLIN PC

(57) ABSTRACT

Described herein is Complex Dielectric Constant Sensor (CDCS) incorporating microstrip based radial stub and open circuit stub pair structures that utilize interference coupling between degenerate EIT modes to detect CDC of sample-under-test (SUT). In at least one embodiment, CDCS generates two distinct EIT modes when sensor is unloaded. In at least one embodiment, coupling between resonator modes and interaction of electromagnetic fields with material is affected indicating presence of dielectric sample. In at least one embodiment, two EIT modes become degenerate, causing cancellation and suppressing transparency window when dielectric constant of SUT matches a specific value. In at least one embodiment, CDCS can detect slight changes in complex dielectric properties of SUT. In at least one embodiment, CDCS can characterize materials such as substrate samples based on their CDCs for design and characterization of microwave devices, antennas, and thin film devices.

20 Claims, 18 Drawing Sheets

(58) Field of Classification Search
USPC .......................................................... 324/637
See application file for complete search history.

(56) References Cited

U.S. PATENT DOCUMENTS

| | | | | |
|---|---|---|---|---|
| 2020/0280131 | A1* | 9/2020 | Avser | .................... H01Q 3/2658 |
| 2021/0091472 | A1* | 3/2021 | Avser | .................... H01Q 9/0485 |
| 2022/0094064 | A1* | 3/2022 | Ramalingam | ............ H01Q 1/38 |

OTHER PUBLICATIONS

Amin et al., "A dynamically reconfigurable Fano metamaterial through graphene tuning for switching and sensing applications," Scientific reports, vol. 3, No. 1, pp. 1-8, 2013.

Amin et al., "A THz graphene metasurface for polarization selective virus sensing." Carbon, vol. 176, pp. 580-591, 2021 (13 pages).

Amin et al., "Fano resonance based ultra high-contrast electromagnetic switch," Applied Physics Letters, vol. 110, No. 18, 2017 (7 pages).

Amin et al., "Slow wave applications of electromagnetically induced transparency in microstrip resonator," Scientific reports, vol. 8, No. 1, p. 2357, 2018.

Askari et al., "A refractive-index-based microwave sensor based on classical electromagnetically induced transparency in metamaterials," Optik, vol. 253, p. 168589, 2022 (11 pages).

Beruete et al., "Terahertz sensing based on meta-surfaces," Advanced Optical Materials, vol. 8, No. 3, p. 1900721-1900721, 2020 (26 pages).

Brinker et al., "Review of advances in microwave and millimetre-wave NDT&E: Principles and applications," Philosophical Transactions of the Royal Society A, vol. 378, No. 2182, p. 20190585, 2020 (29 pages).

Chen et al., "Robust method to retrieve the constitutive effective parameters of metamaterials," Physical review E, vol. 70, No. 1, p. 016608, 2004 (7 pages).

Dai et al., "Microfluidics-based microwave sensor," Sensors and Actuators A: Physical, vol. 309, p. 111910, 2020 (16 pages).

Gan et al., "Differential microwave microfluidic sensor based on microstrip complementary split-ring resonator (MCSRR) structure," IEEE Sensors Journal, vol. 20, No. 11, pp. 5876-5884, 2020 (9 pages).

Haq et al., "A Review of Contemporary Microwave Antenna Sensors: Designs, Fabrication Techniques, and Potential Application," IEEE Access, 2023, vol. 11 40064-40074 (11 pages).

Irene, "Applications of spectroscopic ellipsometry to microelectronics," Thin Solid Films, vol. 233, No. 1-2, pp. 96-111, 1993 (43 pages).

Izhar et al, "Monostatic microwave ellipsometry for material characterization," Waves in Random and Complex Media, pp. 1-14, 2021 (15 pages).

Joffe et al., "Novel microwave near-field sensors for material characterization, biology, and nanotechnology," Journal of Applied Physics, vol. 113, No. 6, 2013 (16 pages).

Johs et al., "Recent developments in spectroscopic ellipsometry for in-situ applications," Optical Metrology Roadmap for the Semiconductor, Optical, and Data Storage Industries II, vol. 4449, pp. 41-57, 2001 (18 pages).

Jungk, "Possibilities and limitations of ellipsometry," Thin Solid Films, vol. 234, No. 1-2, pp. 428-431, 1993 (4 pages).

Karl et al., "Characterization of an active metasurface using terahertz ellipsometry," Applied Physics Letters, vol. 111, No. 19, 2017 (6 pages).

Lin et al., "A group-delay-based sensor using active EIT-like effect with double sensing applications," IEEE Sensors Journal, vol. 18, No. 22, pp. 9251-9256, 2018 (6 pages).

Lin et al., "An EIT-based compact microwave sensor with double sensing functions," IEEE Sensors Journal, vol. 16, No. 2, pp. 293-298, 2016 (6 pages).

Liu et al., "Electromagnetically induced transparency in optical microcavities," Nanophotonics, vol. 6, No. 5, pp. 789-811, 2017 (23 pages).

Mason et al., "A resonant co-planar sensor at microwave frequencies for biomedical applications," Sensors and Actuators A: Physical, vol. 202, pp. 170-175, 2013 (6 pages).

Mirzavand et al., "High-resolution bal-anced microwave material sensor with extended dielectric range," IEEE Transactions on Industrial Electronics, vol. 64, No. 2, pp. 1552-1560, 2016 (9 pages).

Munoz-Enano et al., Planar microwave resonant sensors: A review and recent developments, Applied Sciences, vol. 10, No. 7, p. 2615, 2020 (30 pages).

Nepa et al., "Near-field-focused microwave antennas: Near-field shaping and implementation." IEEE Antennas and Propagation Magazine, vol. 59, No. 3, pp. 42-53, 2017 (12 pages).

Nyfors, "Industrial microwave sensors—a review," Subsurface Sensing Technologies and Applications, vol. 1, No. 1, pp. 23-43, 2000 (21 pages).

Oates et al., "Characterization of plasmonic effects in thin films and metamaterials using spectroscopic ellipsometry," Progress in Surface Science, vol. 86, No. 11-12, pp. 328-376, 2011 (49 pages).

Rahman et al., "Planar microwave sensors for accurate measurement of material characterization: A review," Telkomnika (Telecommunication Computing Electronics and Control), vol. 15, No. 3, pp. 1108-1118, 2017 (11 pages).

Ramzan et al., "Electromagnetically induced absorption in the near-field of microwave radiative elements with application to foliage moisture sensing," IEEE Access, vol. 6, pp. 77859-77868, 2018 (10 pages).

Schubert, "Another century of ellipsometry," Annalen der Physik, vol. 518, No. 7-8, pp. 480-497, 2006 (19 pages).

Sharma et al., "A microwave cavity resonator sensor for water-in-oil measurements," Sensors and Actuators B: Chemical, vol. 262, pp. 200-210, 2018 (11 pages).

Shi et al., "A retrieval method of effective electromagnetic parameters for inhomogeneous metamaterials," IEEE Transactions on Microwave Theory and Techniques, vol. 65, No. 4, pp. 1160-1178, 2017 (19 pages).

Sidiqqui et al., "An ultra-sensitive lorentz microwave sensor for detection of low-permittivity gaseous water states and sub-wavelength biosamples," IEEE Sensors Journal, vol. 21, No. 22, pp. 26014-26022, 2021 (9 pages).

Smith et al., "Electromagnetic parameter retrieval from inhomogeneous metamaterials," Physical review E, vol. 71, No. 3, p. 036617, 2005 (11 pages).

Yan et al., "The terahertz electromagnetically induced transparency-like metamaterials for sensitive biosensors in the detection of cancer cells," Biosensors and Bioelectronics, vol. 126, pp. 485-492, 2019 (18 pages).

Zheng et al., "A review of EMG-, FMG-, and EIT-based biosensors and relevant human-machine interactivities and biomedical applications," Biosensors, vol. 12, No. 7, p. 516, 2022 (37 pages).

Zhu et al., "Dual-band electromagnetically induced transparency (EIT) terahertz metamaterial sensor," Optical Materials Express, vol. 11, No. 7, pp. 2109-2121, 2021 (13 pages).

* cited by examiner

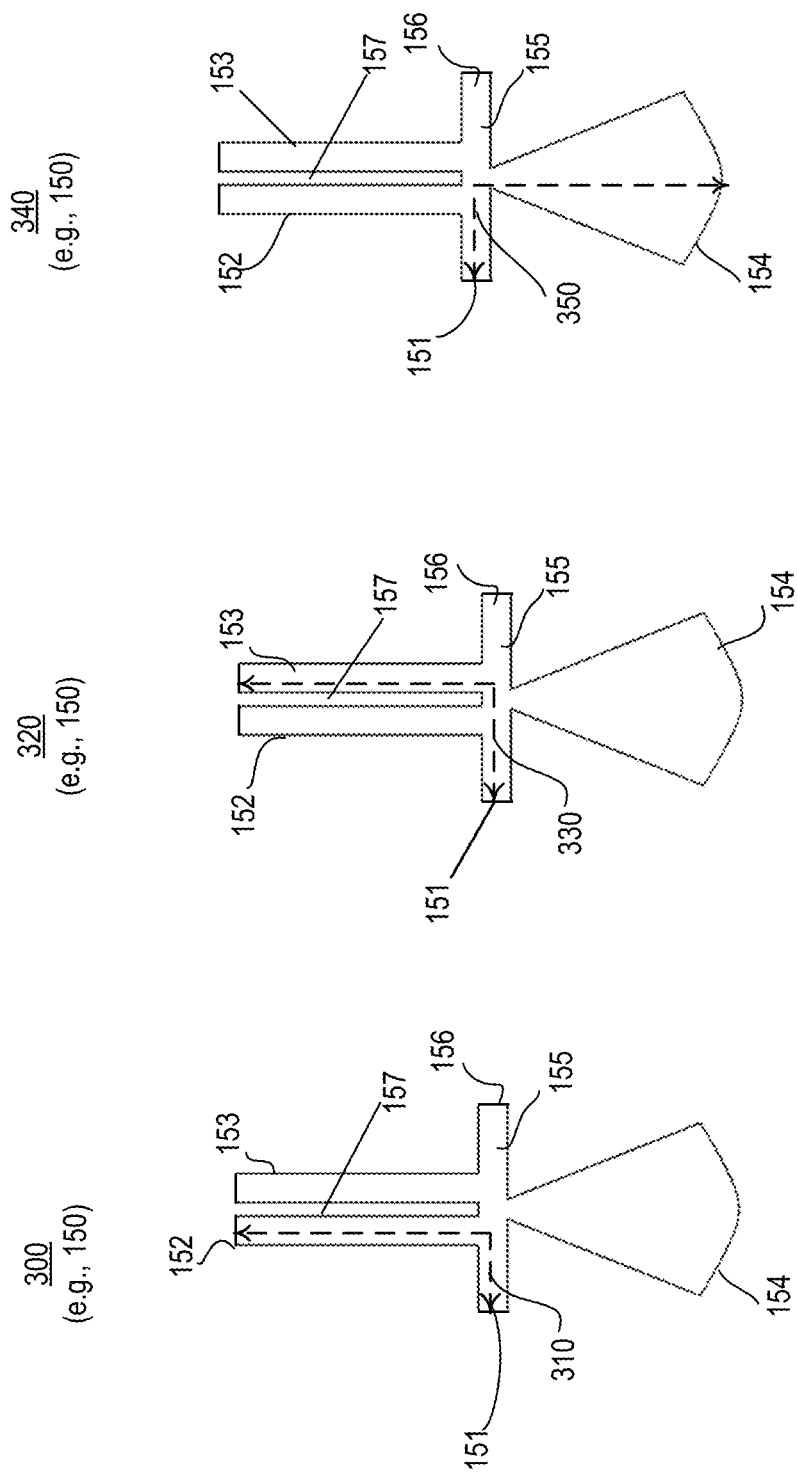

COMPLEX DIELECTRIC CONSTANT SENSING SYSTEM AND METHOD

TECHNICAL FIELD

At least one embodiment is generally related to electronic sensing of one or more complex dielectric constants, and more particularly related to a system and method of complex dielectric constant sensing that may not apply a calibration of the system.

BACKGROUND

The retrieval of complex dielectric properties of materials such as substrates and thin films is a lengthy and tedious task. Especially during bulk fabrication, a significant amount of time is taken to characterize the complex dielectric properties of each substrate sample using the traditional techniques based on optical ellipsometry, transmission/reflection characteristics, cavity resonators, microwave based electrical impedance tomography (EIT) sensors, and other direct and indirect material characterization techniques. A family of sensors and sensing techniques that measure complex dielectric constants (CDCs) for material characterization, such as substrate samples, etc., are being used in various fields such as material science, biomedical engineering, manufacturing, and geophysics. But these sensors are large, have relatively lower sensitivity, consume relatively higher power, entail higher manufacturing cost, and use periodic calibration to maintain accuracy. These sensors may not work outside the optical spectrum and their use may be limited to bulk samples. And therefore, may not work on samples with arbitrary shapes and smaller volumes.

The background description provided here is for the purpose of generally presenting the context of the disclosure. Unless otherwise indicated here, the material described in this section is not prior art to the claims in this application and are not admitted to be prior art by inclusion in this section.

BRIEF DESCRIPTION OF THE DRAWINGS

At least one embodiment may be understood more fully from detailed description given below and from accompanying drawings, which, however, should not be taken to be limiting, but are for explanation and understanding.

FIG. 3 illustrates three different lengths which determine resonance frequencies of open stubs of U-shaped resonator and a radial stub of a CDCS, in accordance with at least one embodiment.

DETAILED DESCRIPTION

In at least one embodiment, a Complex Dielectric Constant Sensing System (CDCSS) comprises a Complex Dielectric Constant Sensor (CDCS) and related circuits. In at least one embodiment, CDCS may be based on dual Electromagnetically Induced Transparency (EIT) resonance based complex dielectric constant (CDC) comparator comprising two resonator structures, U-shaped resonator structure, and radial resonator structure, and a transmission line circuit that can characterize a dielectric material by comparing the transmission characteristics of a Sample-Under-Test (SUT) with the mode splitting degenerate EIT resonance response at a degenerate CDC. In at least one embodiment, CDCSS may allow for detecting the CDC of samples of arbitrary shapes and volumes including but not limited to substrate samples, thin films, antennas, and microwave devices. In at least one embodiment, CDCS can also be used for characterization of industrial dielectric materials including CDC characterization of substrate samples during the process of bulk fabrication.

In at least one embodiment, CDCS can characterize the CDC of an SUT. As such, changes in CDC due to a variation in the temperature are canceled because of the differential sensing; therefore, the calibration of sensors of system may not be required, which makes CDCS accurate, low power, and a real-time detector.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction, and may be implemented with any suitable type of signal scheme.

It is pointed out that those elements of the figures having the same reference numbers (or names) as the elements of any other figure can operate or function in any manner like that described but are not limited to such.

Figure 1A:
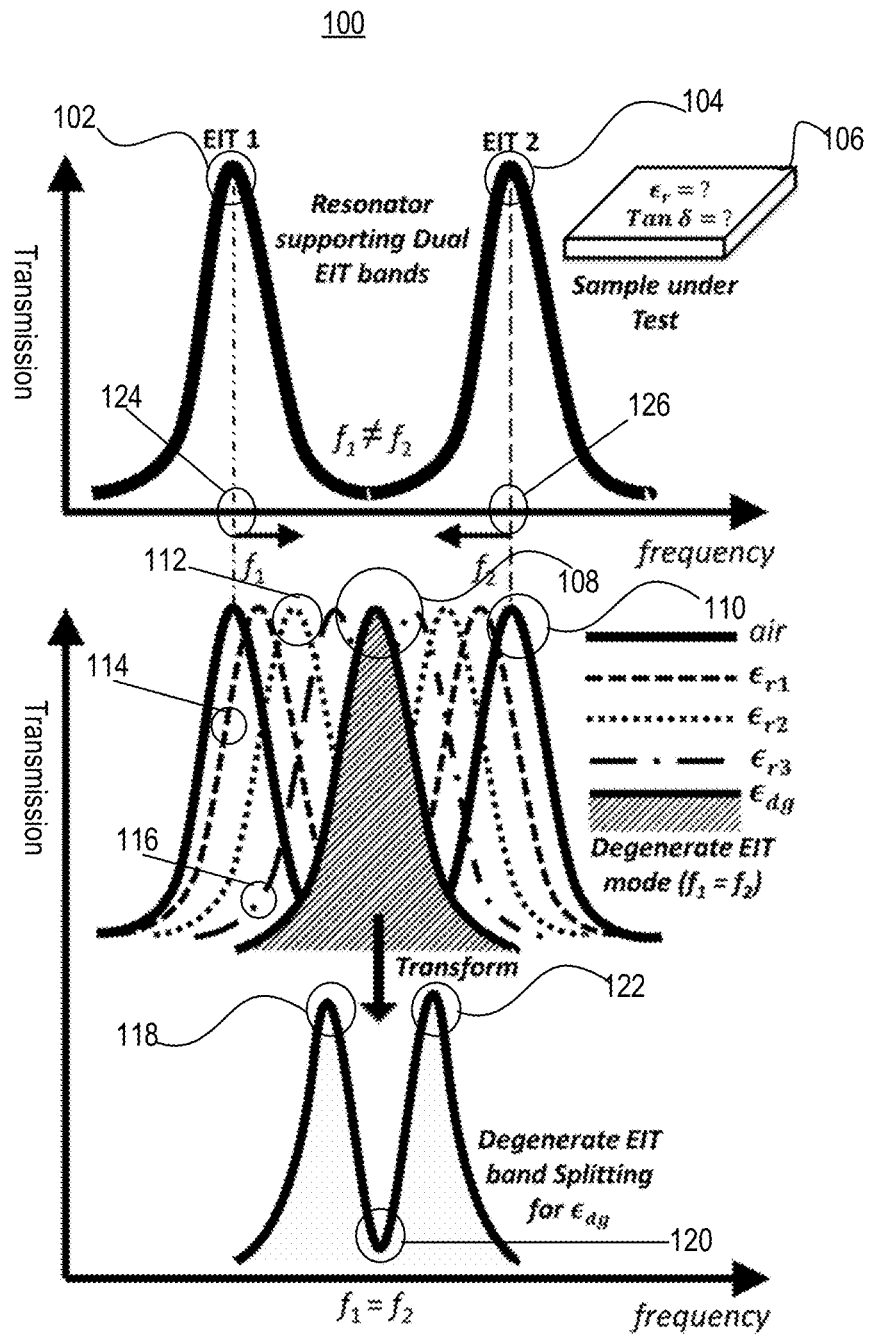
FIG. 1A illustrates a set of plots of dual electromagnetically induced transparency (EIT) bands that may be supported by the Complex Dielectric Constant Sensor (CDCS) at two distinct frequencies.
Figure 1B:
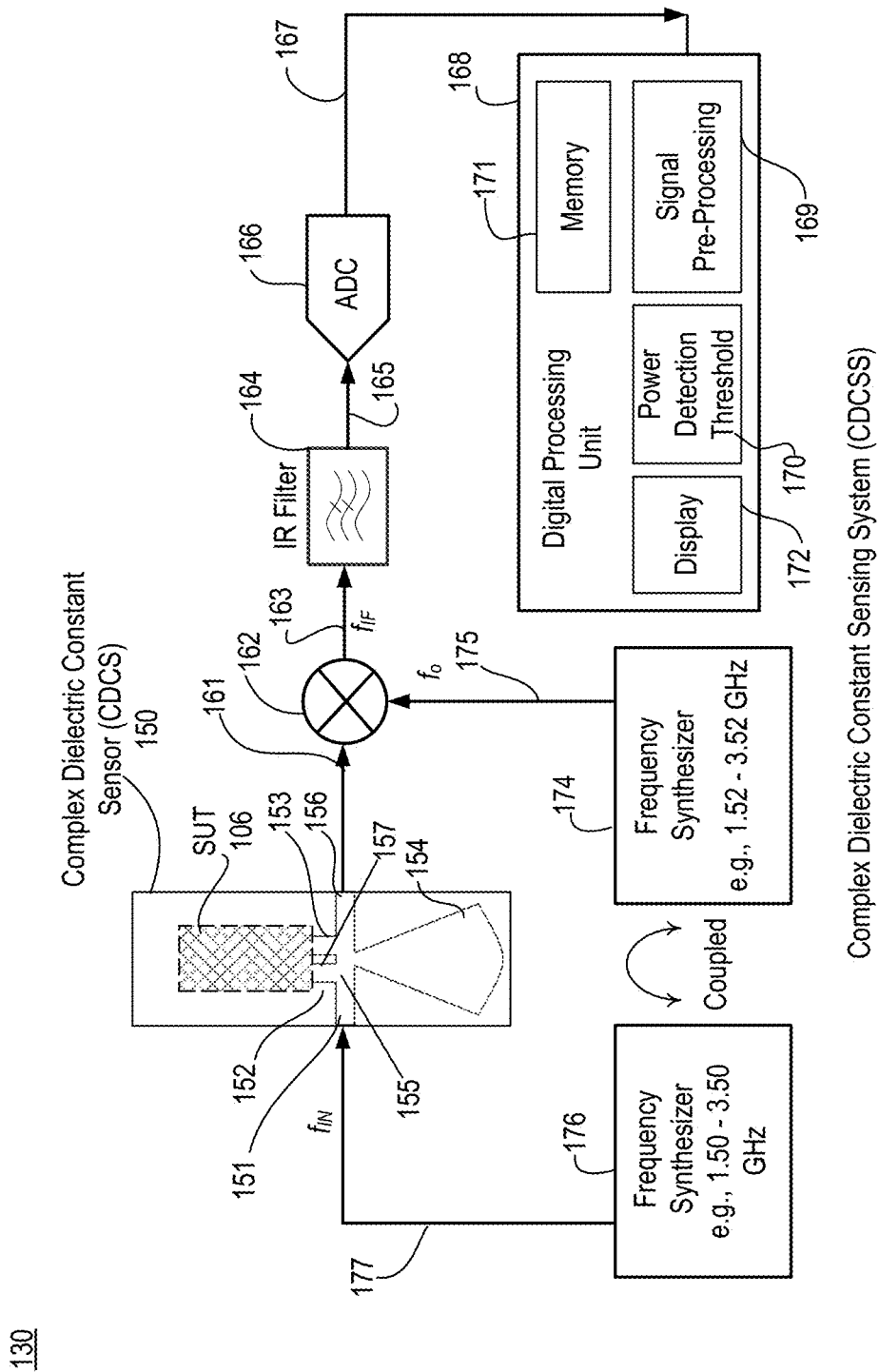
FIG. 1B illustrates a Complex Dielectric Constant Sensing System (CDCSS), in accordance with at least one embodiment.

FIG. 1A illustrates set of plots 100 of dual electromagnetically induced transparency (EIT) bands, EIT 1 102 and EIT 2 104, at two distinct frequencies $f_1$ 124 and $f_2$ 126, in accordance with at least one embodiment. FIG. 1B illustrates a Complex Dielectric Constant Sensor System (CDCSS) 130, in accordance with at least one embodiment. In at least one example, CDCSS 130 comprises Complex Dielectric Constant Sensor (CDCS) 150, which includes sample-under-test (SUT) 106, port 151, stubs 152 and 153, first resonator 154 (e.g., radial resonator), transmission line 155, port 156, second resonator 157 (e.g., U-shaped resonator), interconnect carrying output signal 161, mixer 162, interconnect carrying intermediate frequency signal $f_{IF}$ 163, Image Reject (IR) filter 164, analog-to-digital converter (ADC) 166, interconnect carrying digital signal 167, digital processing unit 168 which includes power detection threshold 170, memory 171, display 172, signal pre-processing 169, first frequency synthesizer 174, interconnect carrying oscillator signal $f_o$ 175, second frequency synthesizer 176, and input frequency signal $f_{IN}$ 177.

In at least one embodiment, CDCSS 130 supports EIT 1 102 and EIT 2 104 at distinct frequencies $f_1$ 124 and $f_2$ 126. In at least one embodiment, the CDCSS 150 exhibits resonance shifts in the EIT bands 102 and 104 from the unloaded response 110, due to the presence of SUT 106 of different dielectric constants $\epsilon_{r1}$ 114, $\epsilon_{r2}$ 112, $\epsilon_{r3}$ 116, and $\epsilon_{dg}$ 108. In at least one embodiment, the two EIT modes 102 and 104 might become degenerate and merge at $\epsilon_{dg}$ 108, when $f_1$ 124 becomes equal to $f_2$ 126, that can cancel one another in the EIT band and may cause a dip in the spectrum 120 between two peaks 118 and 122.

In at least one embodiment, CDCSS 150 determines whether the CDC value of an SUT is the same when compared with that of degenerate CDC $\epsilon_{dg}$ 108. In at least one embodiment, first frequency synthesizer 174 generates oscillator signal $f_o$ 175 in a first frequency range (e.g., 1.52 GHz to 3.52 GHZ). In at least one embodiment, second frequency synthesizer 176 generates input frequency signal $f_{IN}$ 177 for dual EIT CDCS 160 in a second frequency range (e.g., 1.5 GHz to 3.5 GHZ). In at least one embodiment, the second frequency range may also contain frequency points at which CDC sensing is desired.

In at least one embodiment, dual EIT CDCS 160 compares CDC of SUT 106 with that of degenerate EIT $\epsilon_{dg}$ 108. In at least one embodiment, output signal 161 is generated from dual EIT CDCS. In at least one embodiment, output signal 161 may be an attenuated and phase-shifted form of input signal $f_{IN}$ 177. In at least one embodiment, output signal 161 passes through transmission line 155 and is fed to mixer 162.

In at least one embodiment, mixer 162 takes an RF signal from CDCS 160 and oscillator signal $f_o$ 175 from first frequency synthesizer 174 as an input. In at least one embodiment, first frequency synthesizer 174 and second frequency synthesizer 176 are coupled with each other and produce a signal with a fixed offset of 20 MHz. In at least one embodiment, any offset frequency can be selected, but may be half of an ADC sampling frequency to meet the Nyquist sampling criteria. In at least one embodiment, mixer 162 produces an intermediate frequency signal $f_{IN}$ 163 which comprises a sum and difference of input frequencies, and can be expressed as $f_{IN}=f_{IN}\pm fo$. In at least one embodiment, high frequency component of intermediate frequency signal $f_{IN}$ 163 is filtered by IR filter 164 which produces low frequency analog signal 165. In at least one embodiment, signal 165 has the same frequency as that of the offset between oscillator signal $f_o$ 175 and input signal $f_{IN}$ 177 from first frequency synthesizer 174 and second frequency synthesizer 176, respectively.

In at least one embodiment, low frequency analog signal 165 (e.g., 20 MHz) may be converted to a digital signal using Analog to Digital Converter (ADC) 166 which produces digital signal 167. In at least one embodiment, ADC 166 converts continuous physical quantities (e.g., voltages) to digital numbers that represent the amplitude of the physical quantities. In at least one embodiment, ADC 166 is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC. In at least one embodiment, sampling frequency of ADC 166 may be substantially twice than the frequency of low frequency analog signal 165, thus meeting the Nyquist sampling criteria. In at least one embodiment, sampling frequency of ADC 166 may be 40 MS/s which is twice the frequency of 20 MHz of low frequency analog signal 165. In at least one embodiment, output of ADC 166 is provided to digital processing unit 168 for further processing.

In at least one embodiment, digital signal 167 may be processed in digital pre-processing block 169 which may be programmed to execute mathematical methods such as sub-sampling, antialiasing, filtering, and/or averaging. In at least one embodiment, digital pre-processing block 169 can be a Digital Signal Processor (DSP), an Application Specific Integrated Circuit (ASIC), a general-purpose Central Processing Unit (CPU), Graphics Processor Unit (GPU), or a low power logic implementing a finite state machine to perform the method of various embodiments, etc.

In at least one embodiment, memory 171 stores processed data in a format used by disclosed differential CDC sensing method. In at least one embodiment, memory 171 can include nonvolatile memory such that state does not change if the power to the memory device is interrupted, and/or volatile memory such that state is indeterminate if the power to the memory device is interrupted. In at least one embodiment, examples of nonvolatile memory include flash memory, magnetic memory, resistive memory, ferroelectric memory, etc. In at least one embodiment, examples of volatile memory include static random-access memory, dynamic random-access memory, etc. In at least one embodiment, memory 171 can store processed data, whether long-term or temporary, related to the execution of applications and functions of CDCSS 150.

In at least one embodiment, memory 171 comprises a machine-readable media for storing computer-executable instructions (e.g., instructions to implement any other processes discussed herein). In at least one embodiment, machine-readable medium may include, but is not limited to, flash memory, optical disks, CD-ROMs, DVD ROMs, RAMS, EPROMs, EEPROMs, magnetic or optical cards, phase change memory (PCM), or other types of machine-readable media suitable for storing electronic or computer-executable instructions. At least one embodiment may be downloaded as a computer program (e.g., BIOS) which may be transferred from a remote computer (e.g., a server) to a requesting computer (e.g., a client) by way of data signals via a communication link (e.g., a modem or network connection).

In at least one embodiment, power detection and threshold block 170 detects a signal when crossing a certain predefined threshold to find a magnitude of degenerate mode split. In at least one embodiment, results are reported in a graph format on display unit 172.

Figure 2A:
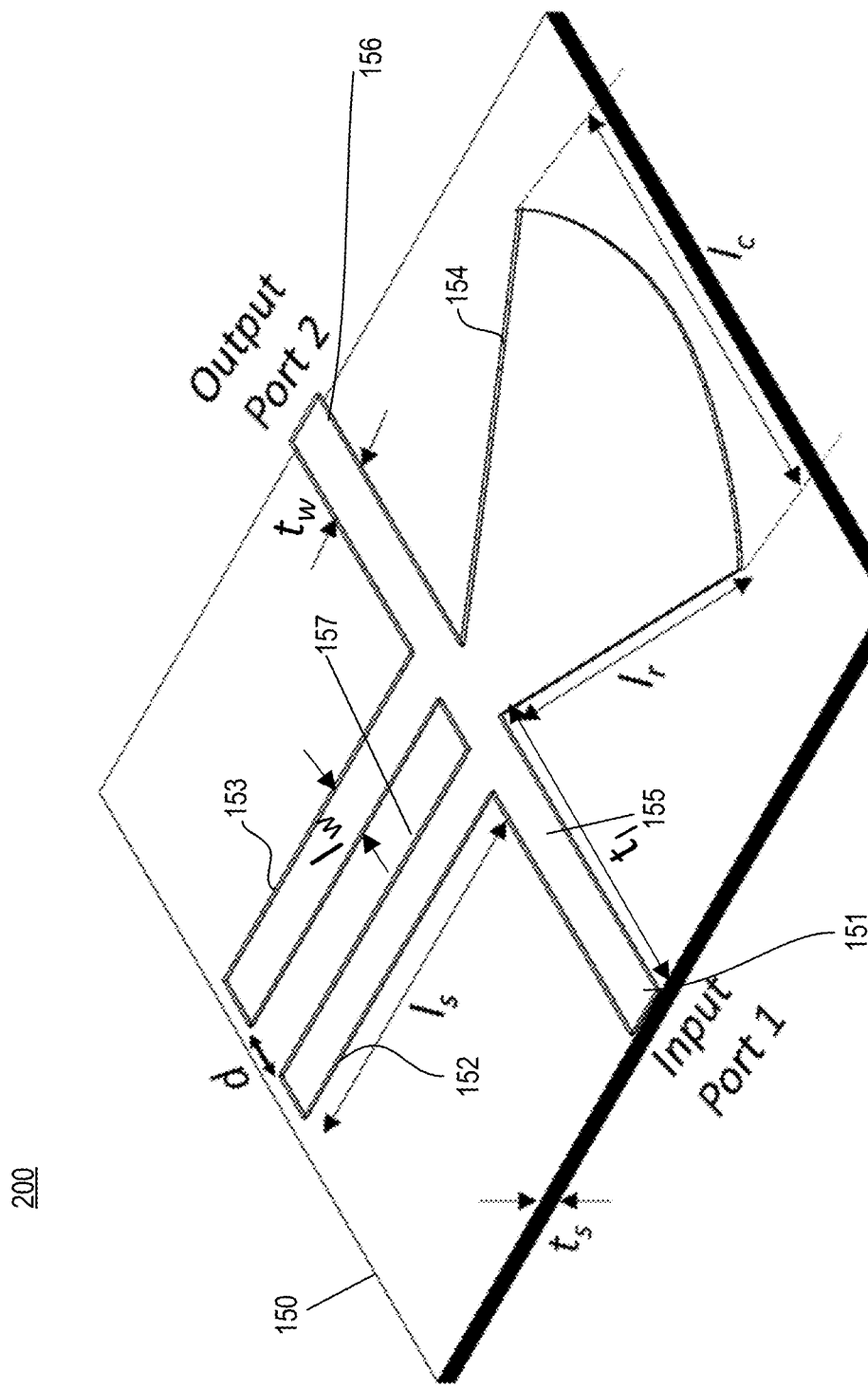
FIG. 2A illustrates a structure of a CDCS, in accordance with at least one embodiment.

FIG. 2A illustrates structure 200 of CDCS 160, in accordance with at least one embodiment. In at least one embodiment, CDCS 160 comprises a transmission line 155 with U-shaped resonator 157 made of two symmetric rectangular vertical open stubs 152 and 153 with the same lengths and widths, and a radial resonator 154. In at least one embodiment, structure 200 comprises of main transmission line 155 with two open stubs 152 and 153, one radial stub 154, and ports 151 and 156 (e.g., two matched RF ports). In at least one embodiment, stubs 152 and 153, connected to the upper side of transmission line 155, form a U-shaped resonator structure; and stub 154, connected to the lower side of transmission line 155, forms a radial resonator structure. In at least one embodiment, U-shaped structure comprising two stubs 152 and 153, and a radial structure, when connected to opposite sides of transmission line 155, but substantially at its center or middle point, makes a sensor.

In at least one embodiment, dual EIT based CDCS structure 200 may be implemented as a microstrip structure on a printed circuit board (PCB) at any scale depending on an operating frequency range and the desired degenerate CDC. In at least one embodiment, design parameters of structure 200 include PCBs' dielectric material, transmission line length $t_l$, transmission line width $t_w$, radial stub length $l_r$, radial stub arc length $l_c$, vertical stub length $l_s$, vertical stub width $l_w$, and distance between vertical stubs d. In at least one embodiment, two open stubs 152 and 153 are arranged across transmission line 155 in the form of U-shaped stub 157. In at least one embodiment, U-shaped stub 157 comprising vertical open stubs 152 and 153, is placed on one side of transmission line 155. In at least one embodiment, radial stub 154 is placed on the opposite side of transmission line 155. In at least one embodiment, since the length and width of vertical stubs and distance between two stubs is the same in U-shaped resonator, they resonate at the same frequency and produce an EIT resonance at that frequency. In at least one embodiment, radial stub 154 produces notch filter-like response. In at least one embodiment, the notch filter-like resonance field of the radial stub 154 interacts with the EIT resonance of the U-shaped stub 157 to produce two distinct EIT bands within the transmission spectrum. In at least one embodiment, at resonance, a strong electric field exists at open edges of U-shaped stub 157 and radial stub 154 which are then used for CDC sensing. In at least one embodiment, SUT 106 can be placed at the edges of two open stubs 152 and 153.

Figure 2B:
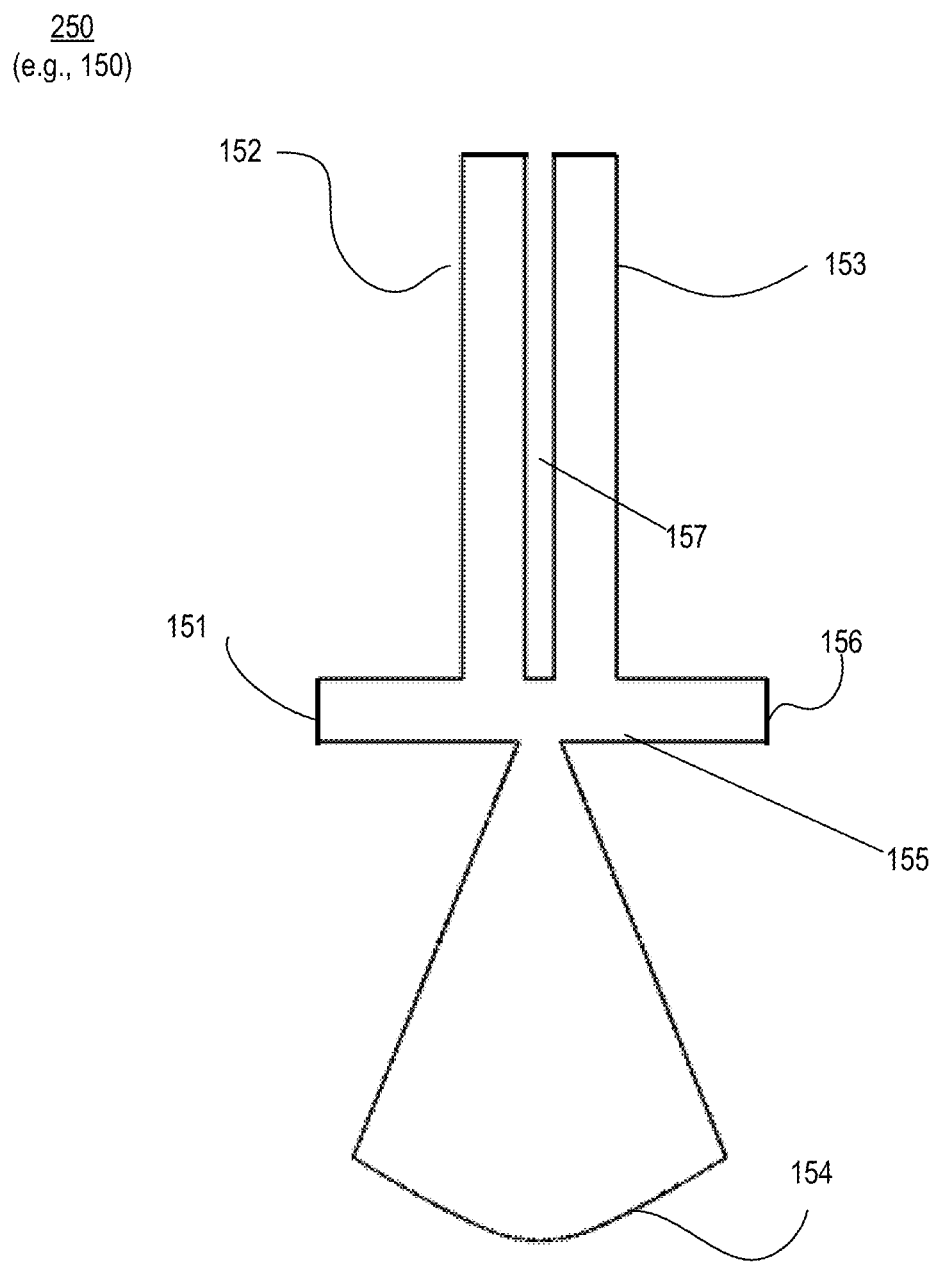
FIG. 2B illustrates a structure of top layer of a CDCS comprising of open stubs based U-shaped resonator and a radial stub resonator of a CDCS, in accordance with at least one embodiment.

FIG. 2B illustrates top layer 250 of the CDCS structure 200 of FIG. 2A. In at least one embodiment, the vertical open stubs 152 and 153 are placed on one side of transmission line 155 forming U-shaped stub 157. In at least one embodiment, radial stub 154 is placed on the opposite side of transmission line 155. In at least one embodiment, U-shaped stub 157 and radial stub 154 combine on opposite ends of transmission line 155 with two matched RF input and output ports 151 and 156 to form CDCS 160.

FIG. 3 illustrates three configurations 300, 320, and 340, respectively representing different lengths 310, 330, and 350 which determine the resonance frequencies of open stubs 152 and 153 of U-shaped resonator 157, and radial stub resonator 154 of CDCS, in accordance with at least one embodiment. In at least one embodiment, three electrical lengths 310, 330, and 350 utilize part of U-shaped resonator 157, radial resonator 154, and transmission line 160 of FIG. 2A. In at least one embodiment, electrical lengths determine the resonance frequencies of open-ended stubs 152 and 153, and radial stub 154. In at least one embodiment, small distance d as shown in FIG. 2A, between two stubs makes a resonant U-shaped stub to constructively interfere in the EIT band. In at least one embodiment, stub 152 resonates at a frequency at which electrical distance 310 becomes one-fourth of the wavelength. In at least one embodiment, stubs 153 and 154 resonate at frequencies at which electrical distances 330 and 350 become one-fourth of wavelength, respectively. In at least one embodiment, electrical lengths are a function of an operating frequency band. In at least one embodiment, the radial stub resonates to give the notch a filter-like response. In at least one embodiment resonances of U-shaped stub and radial stub interfere to produce dual EIT response. In at least one embodiment, the shape of the transmittance plot is due to combined transmittance response of the U-shaped structure and radial structure.

Figure 4A:
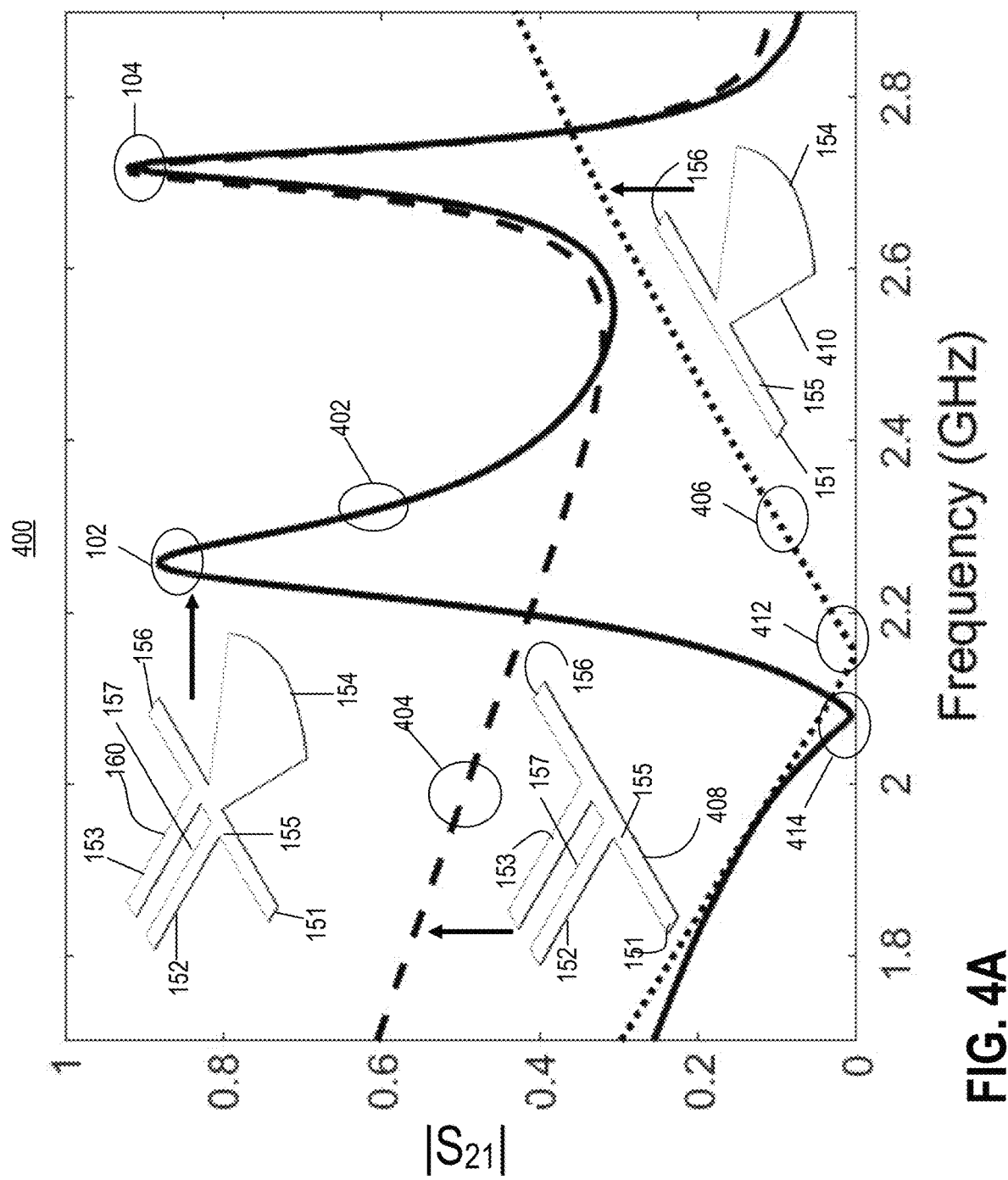
FIG. 4A illustrates a spectral response of a U-shaped resonator and a radial stub resonator of a CDCS along with the spectral transmission (S21) response of combined CDCS with both U-shaped and radial stub resonators, in accordance with at least one embodiment.

FIG. 4A illustrates plot 400 showing spectral response of resonator components of CDCS 160. In at least one embodiment, the radial stub resonator structure 410 with open radial stub 154 exhibits the characteristics of wideband notch filter 406 with dip 412. In at least one embodiment, U-shaped resonator structure 408 shows EIT response 404 with EIT band 2 104. In at least one embodiment, the combined response 402 of U-shaped resonator 157 and radial stub resonator 154 forming CDCS 160 yields another response EIT 1 102 in the EIT band due to the interaction of a notch filter response of a radial stub and the EIT response of a U-shaped stub along with dip 414 due to the notch filter response of the radial stub and EIT 104 due to a U-shaped resonator.

Figure 4B:
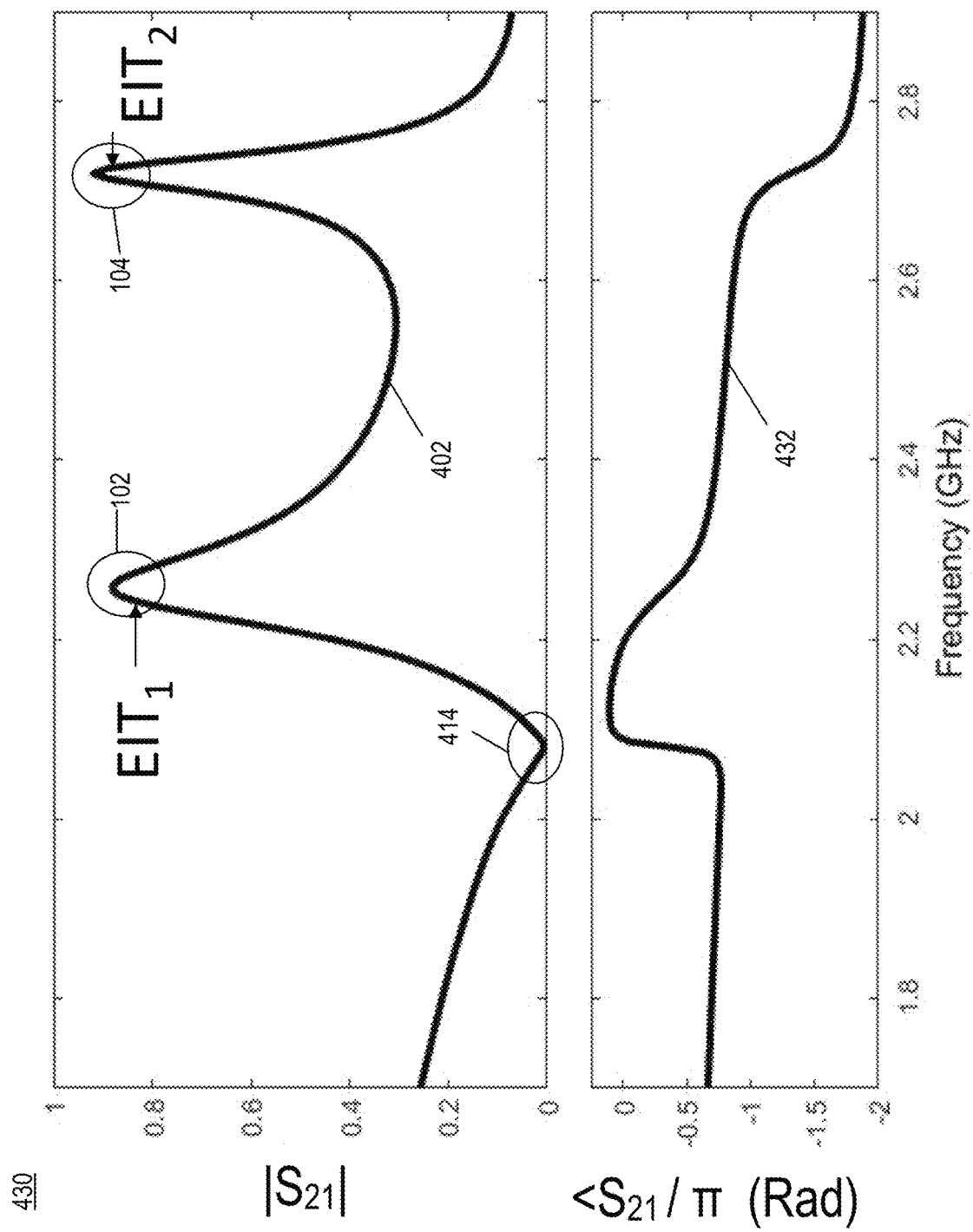
FIG. 4B illustrates a magnitude and phase of transmission (S21) response of the CDCS, in accordance with at least one embodiment.

FIG. 4B illustrates plot 430 showing the model simulation results of parameters like magnitude 402 and phase 432 response of CDCS 160. In at least one embodiment, the CDCS 160 exhibits two distinct EIT bands 102 and 104, and dip 414. In at least one embodiment, first EIT band 1 102 arises due to the destructive interference between radial stub 154 and U-shaped stub 157. In at least one embodiment, second EIT band 2 104, arises due to the EIT response of U-shaped resonator 157. In at least one embodiment, wideband notch response with dip 414 arises due to radial stub resonator 154.

Figure 4C:
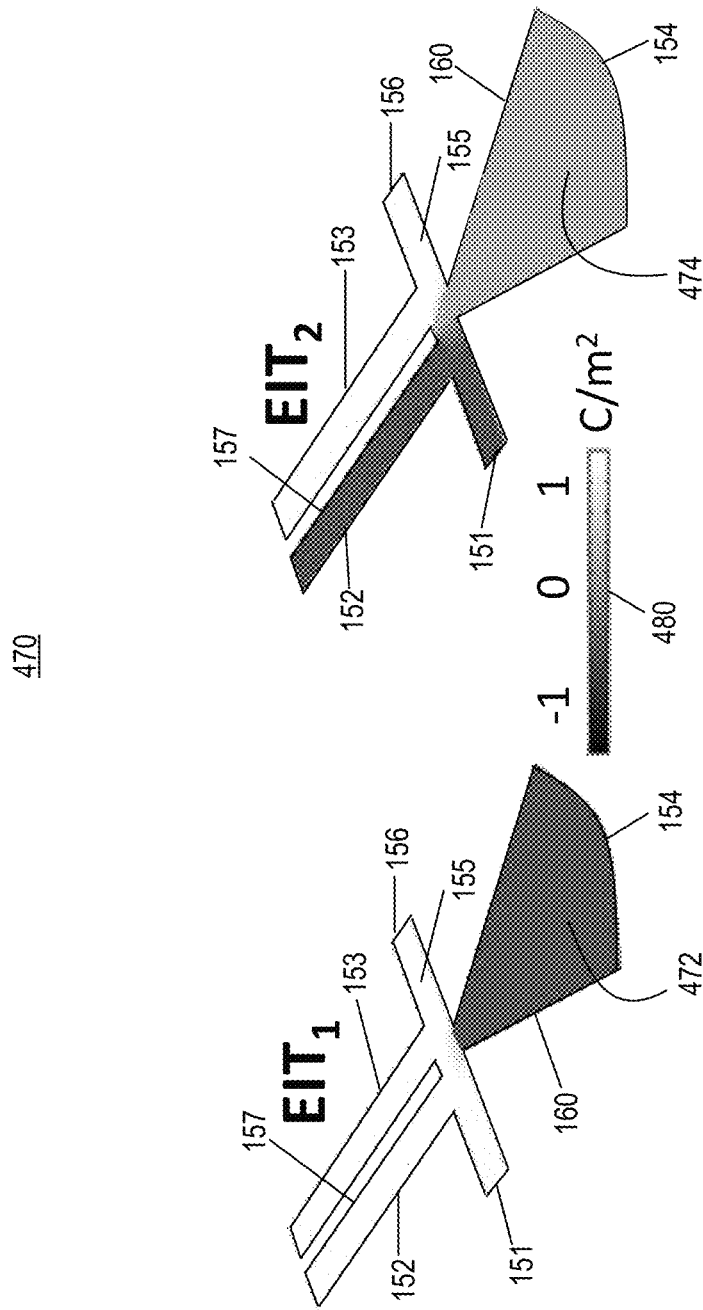
FIG. 4C illustrates a surface charge density of the dual-band CDCS at the two distinct resonant frequencies, in accordance with at least one embodiment.

FIG. 4C illustrates the interference pattern 470 observed in the surface charge density plots 472 and 474 due to EIT 1 102 and EIT 2 104 with color scale 480. In at least one embodiment, U-shaped stub 157 and radial stub 154 possess out-of-phase charges which leads to two distinct EIT resonances within the transmission spectrum. In at least one embodiment, the interference of resonant responses of radial stub and U-shaped stub renders the medium transparent at a specific frequency due to the strong coupling between radial and U-shaped stubs making the way for potential sensing applications.

Figure 5A:
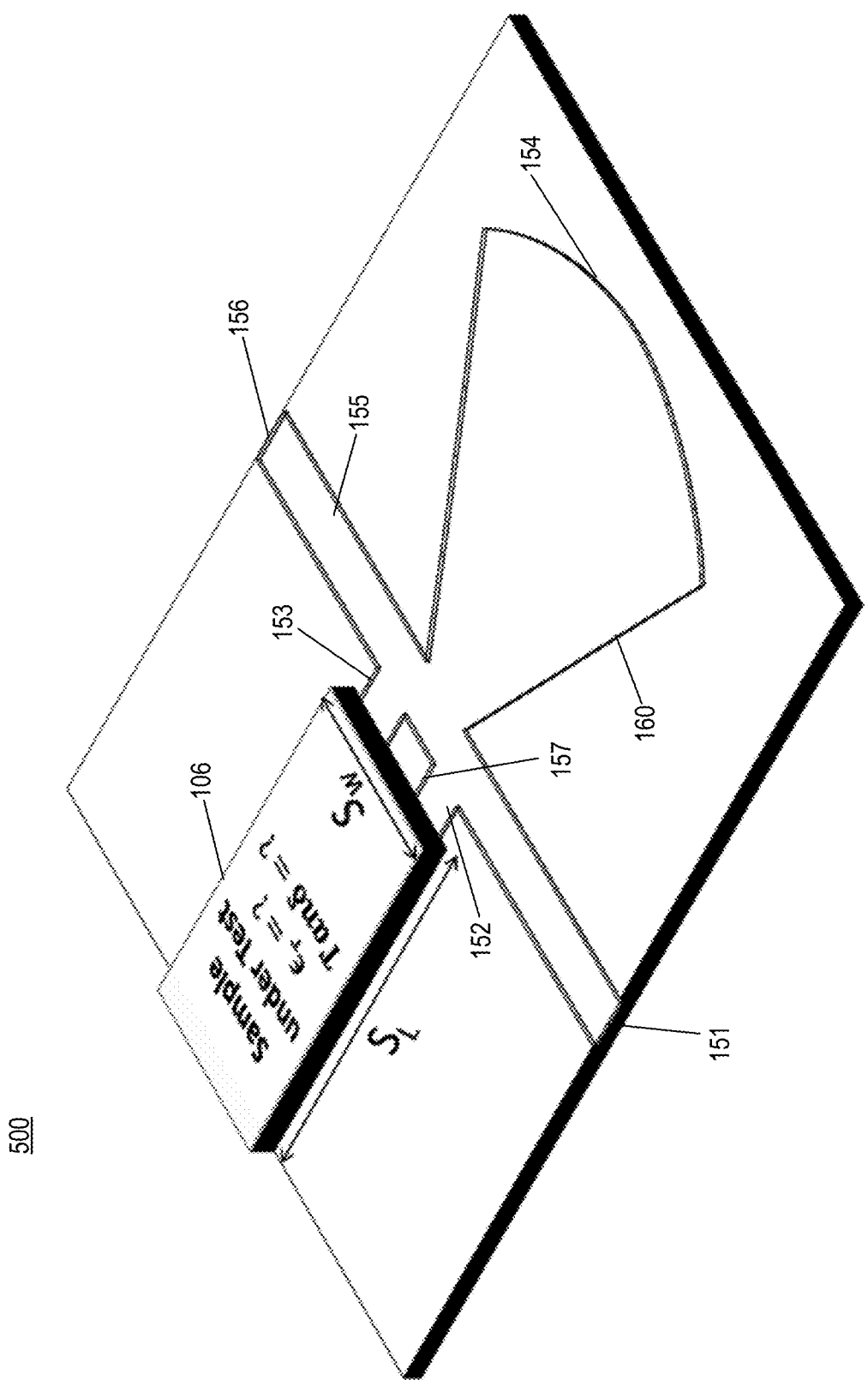
FIG. 5A illustrates an embodiment wherein a Sample-Under-Test (SUT) is placed on the open stubs of a U-shaped resonator, in accordance with at least one embodiment.

FIG. 5A illustrates structure 500 showing CDCS 160 where an SUT 106 is placed on open stubs of U-shaped resonator 157, in accordance with at least one embodiment. FIG. 5A shows location where SUT may be placed on CDCS 160 in accordance with at least one embodiment. In at least one embodiment, SUT 106 may be placed on top of stubs 152 and 153. In at least one embodiment, SUT may be placed at the open end of stubs where electric field distribution is strongest. In at least one embodiment, SUT placed on the top of stubs changes distribution of electric field based on value of its CDC. In at least one embodiment, when CDC value of an SUT is same as that of the degenerate CDC 108, a mode splitting degenerate EIT resonance occurs with dip in the EIT band as a consequence of the destructive interference between EIT band, generated by U-shaped resonator, and the notch filter-like response, generated by radial stub resonator, which shows that an SUT has the same CDC as that of the degenerate CDC. Otherwise, in at least one embodiment, if CDCs of two samples are different, a dual EIT resonance is observed due to the interaction of the transmission field response of the radial and U-shaped stubs. In at least one embodiment, in case of a substrate sample, dual EIT resonance indicates that an SUT contains contamination or fabrication imperfections that may have changed its dielectric properties. In at least one embodiment, the mode splitting degenerate EIT resonance has a high sensitivity compared to that of a simple LC resonator that makes any changes in CDC easily distinguishable when mode splitting resonance is used. In at least one embodiment, CDCS can be compact and may not include power dividers or couplers. In at least one embodiment, high sensitivity of CDCS enables detection of disorders in the substrate fabrication, and the design of thin films, antennas and other microwave devices that require precise dielectric characterization. In at least one embodiment, since CDCs are compared based on the existence of a mode split in an EIT band, the visual inspection of a resonance curve can reveal results without complex data processing on recorded S21 parameter. In at least one embodiment, CDCS may not need calibration. As such, in at least one embodiment, CDCS may be cost-effective and easier to use in the field.

Figure 5B:
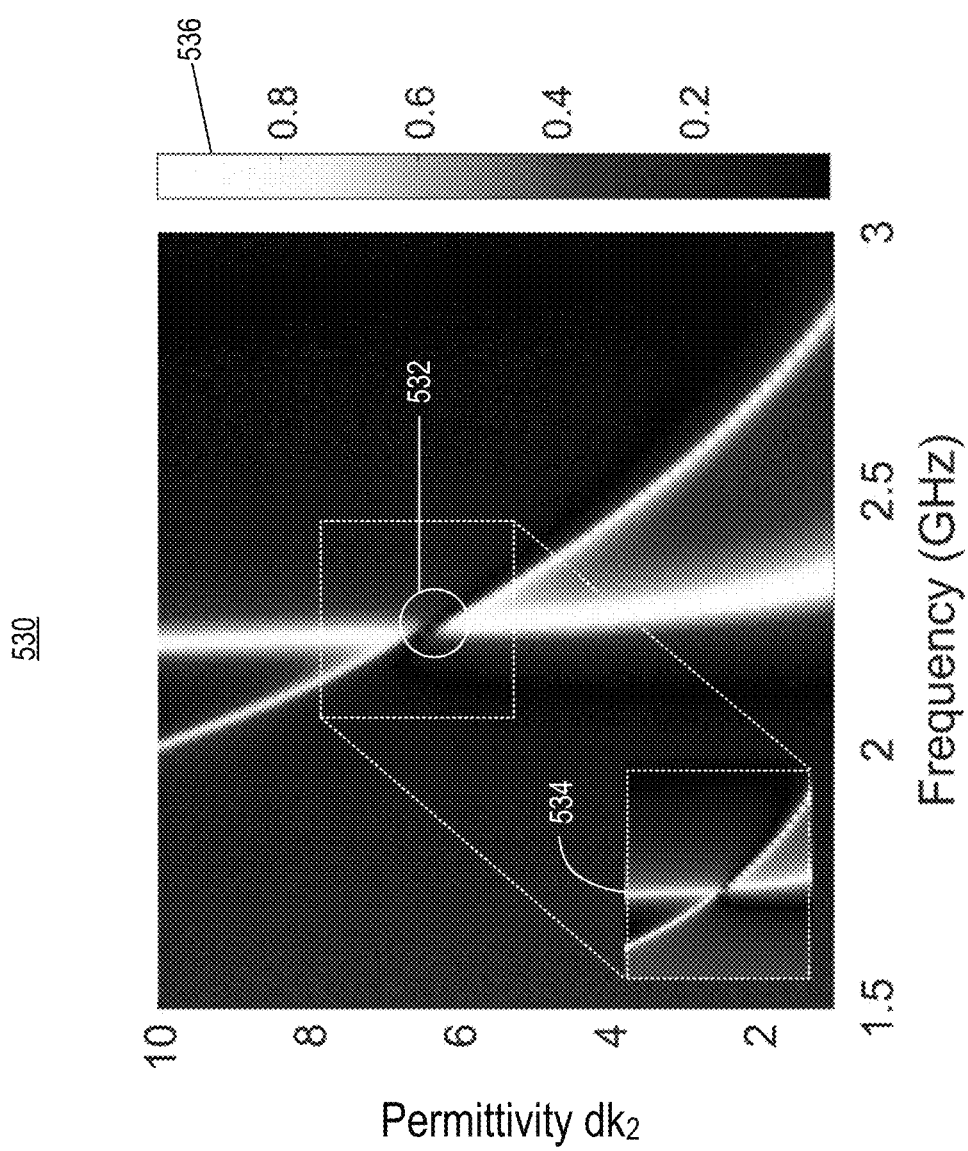
FIG. 5B illustrates a plot showing simulation results for a transmitted field (S21) spectrum because of variations in dielectric constant (Dk) of an SUT, when the SUT is placed on a U-shaped vertical stub, in accordance with at least one embodiment.

FIG. 5B illustrates plot 530 showing simulation results for a transmitted field (S21) spectrum because of variations in the dielectric constant (Dk) to perform the characterization of CDCS, in accordance with at least one embodiment. Here, high/low transmittance in dB is shown on a gray scale 536 in which x-axis shows frequency and y-axis shows Dk of a sample. Plot 530 is a field plot of a CDCS due to variation in Dk of SUT 106, in accordance with at least one embodiment. In this example, the transmission response exhibits high sensitivity 532 to the changes in the Dk of an SUT especially near the degenerate EIT band. In at least one embodiment, the frequency of mode splitting depends on the value of Dk of an SUT as indicated by plot 530. In at least one embodiment the high sensitivity region is shown in inset 534. In at least one embodiment, high sensitivity region 532 makes way for designing highly sensitive CDC sensors with CDC values in the vicinity of the degenerate CDC.

Figure 5C:
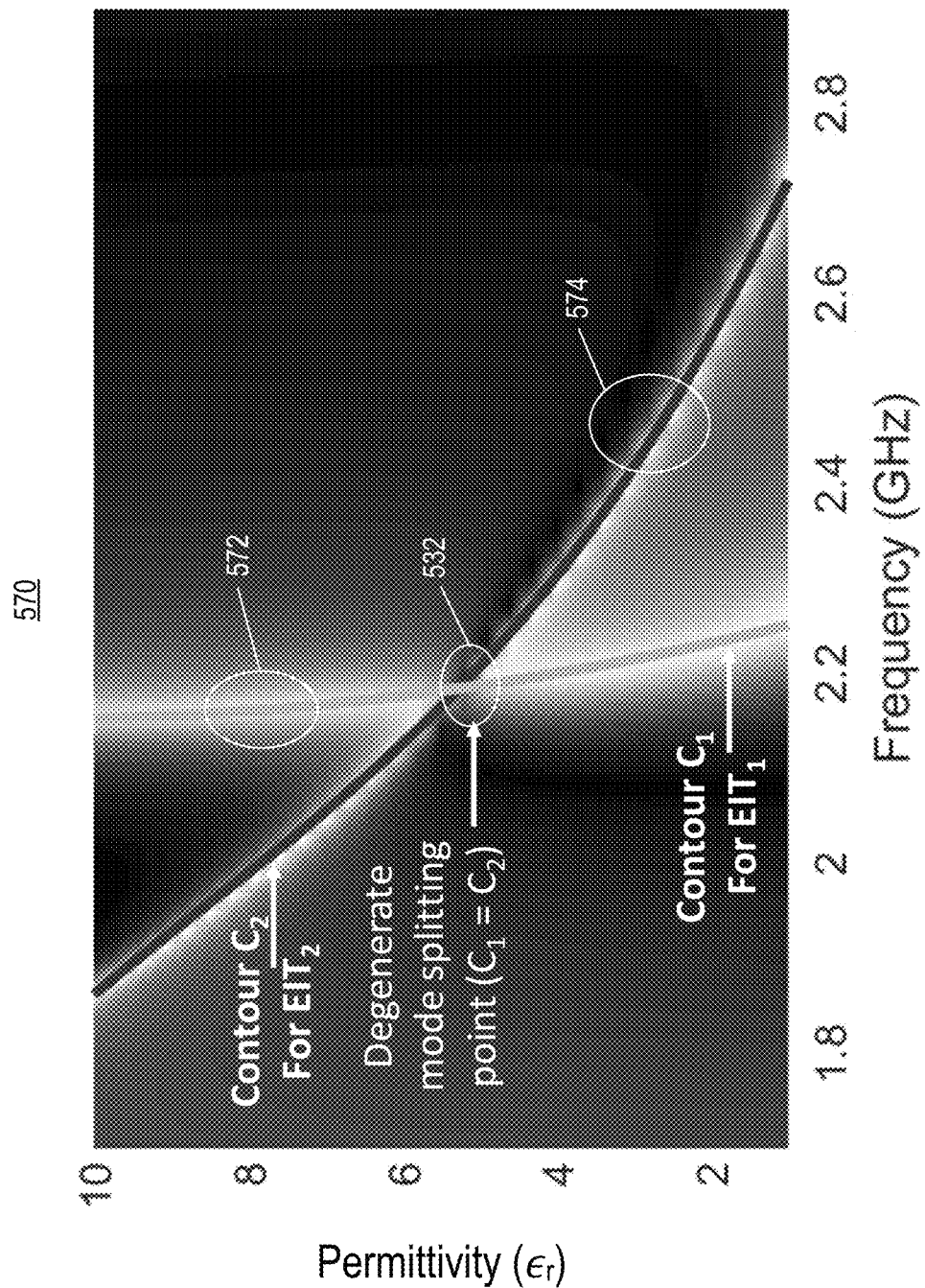
FIG. 5C illustrates a plot showing the curve fitting model for the two distinct EIT bands due to variations in dielectric constant (Dk) of an SUT, when the SUT is placed on a U-shaped vertical stub, in accordance with at least one embodiment.

FIG. 5C illustrates the plot showing a curve fitting model 570 comprising of two polynomial fitted contour plots for EIT bands EIT 1 102 and EIT 2 104 due to a variation in the Dk of an SUT. In FIG. 5C, 572 shows the curve fitting model for EIT 1 102 and 574 and curve fitting model for EIT 2 104. In at least one embodiment, curves 572 and 574 intersect each other within the high sensitivity region 532 at the mode splitting point 120. The resonance frequency $f_1$ for contour plot of EIT 1 and $f_2$ for contour plot of EIT 2 may be given by:

$$f_1 = 0.00098657\epsilon_r^2 - 0.021811\epsilon_r + 2.272$$
$$f_2 = -0.0006979\epsilon_r^3 + 0.01771\epsilon_r^2 - 0.2126\epsilon_r + 2.915$$

In at least one embodiment, resonant shifts $df_1/d\epsilon_r$ and $df_2/d\epsilon_r$ in EIT bands EIT 1 and EIT 2 respectively, can be utilized to determine their spectral sensing sensitivity. In at least one embodiment, CDCS offers novel ultra-sensing due to its unique mode splitting approach. In at least one embodiment, the destructive interference between the responses of radial and U-shaped stubs makes CDCS highly suitable for detecting slight variations in the Dk of an SUT within the high sensitivity region 532.

Figure 6A:
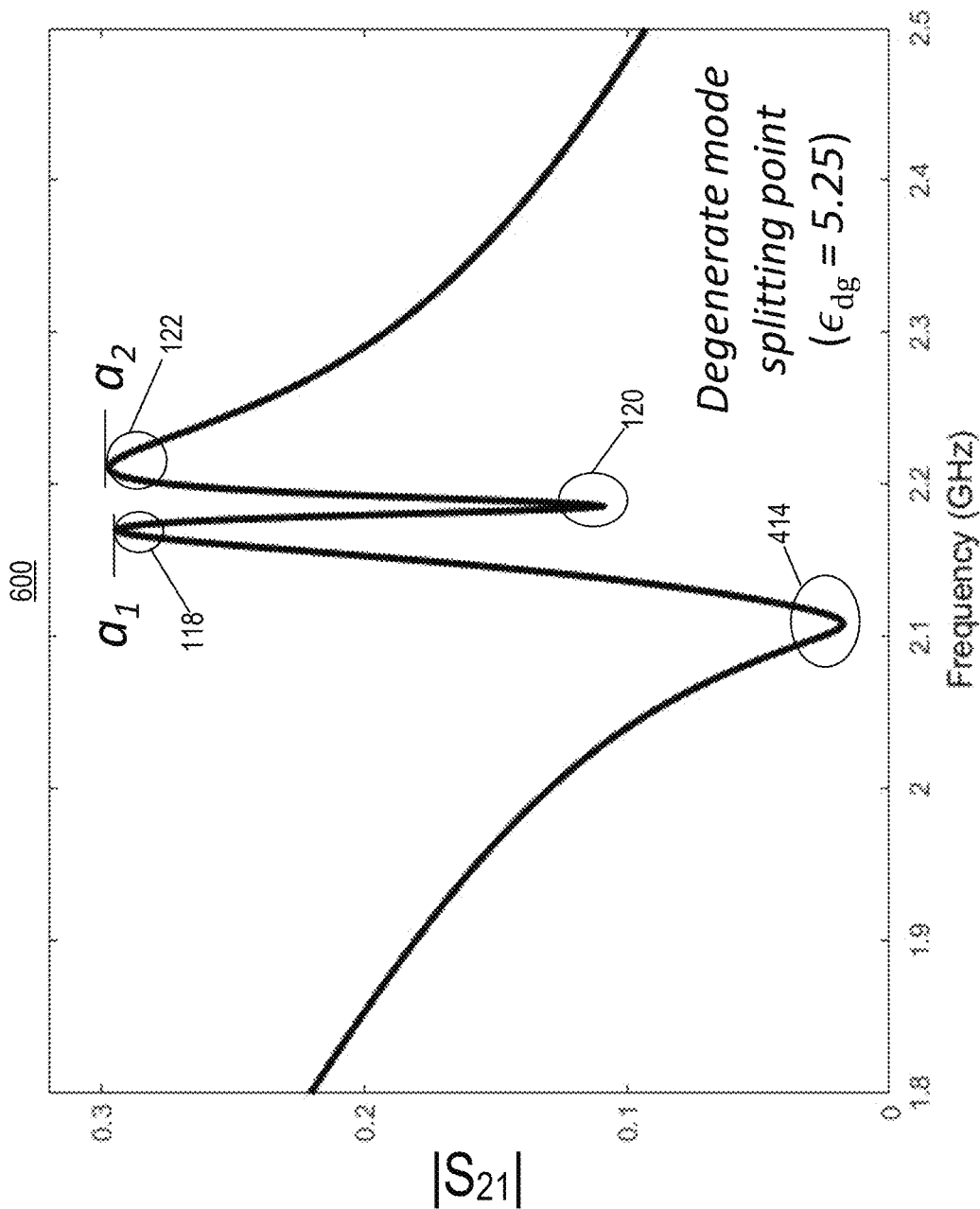
FIG. 6A illustrates transmission characteristics (S21) of a CDCS at degenerate EIT band splitting point, when the SUT has a Dk equal to the degenerate Dk of the CDCS, in accordance with at least one embodiment.
Figure 6B:
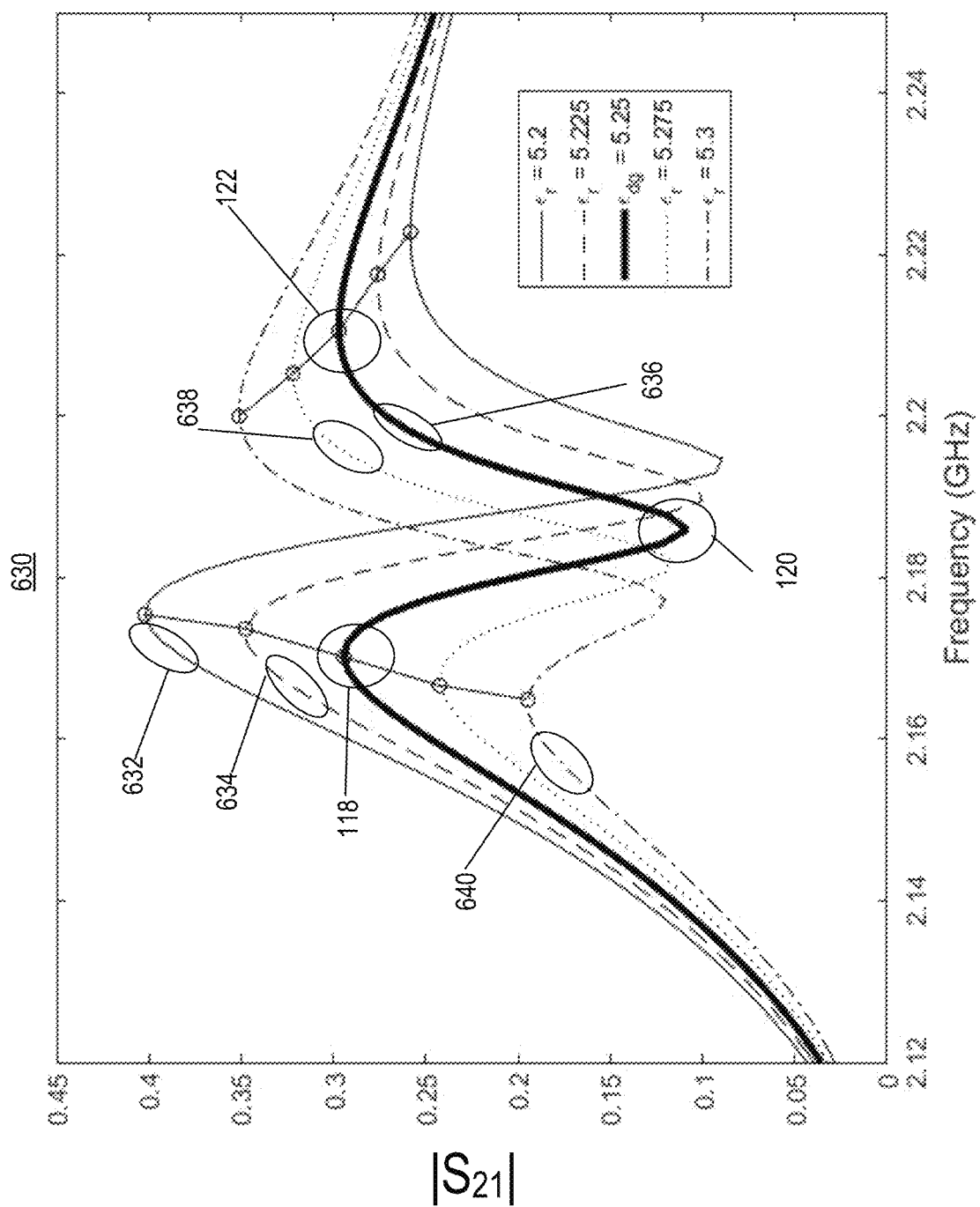
FIG. 6B illustrates transmission characteristics (S21) of a CDCS due to a slight variation in the Dk of an SUT, in accordance with at least one embodiment.

FIG. 6A illustrates plot 600 showing the simulation results for a transmitted field (S21) spectrum of a CDCS with notch 414, two peaks 118 and 122, and dip 120 at degenerate CDC $\epsilon_{dg}$. In at least one embodiment, the peak amplitudes $a_1$ and $a_2$ of EIT 1 102 and EIT 2 104 respectively are symmetric at mode splitting CDC (e.g., $a_1/a_2=1$). Slight variation in CDC can make these amplitudes unequal causing CDCS to be highly sensitive to CDC variation. FIG. 6B illustrates plot 630 showing results for transmitted field (S21) spectrums 632, 634, 636, 638, and 640 of CDCS at different Dk values which are slightly away from degenerate Dk $\epsilon_{dg}$. In FIG. 6B, a slight variation in Dk ($\Delta\epsilon=\epsilon_r-\epsilon_{dg}$) substantially changes peak amplitudes $a_1$ and $a_2$ to make them non-symmetric. This behavior can make CDCS a potential candidate for ultrasensitive sensing of the Dk of an SUT.

Figure 6C:
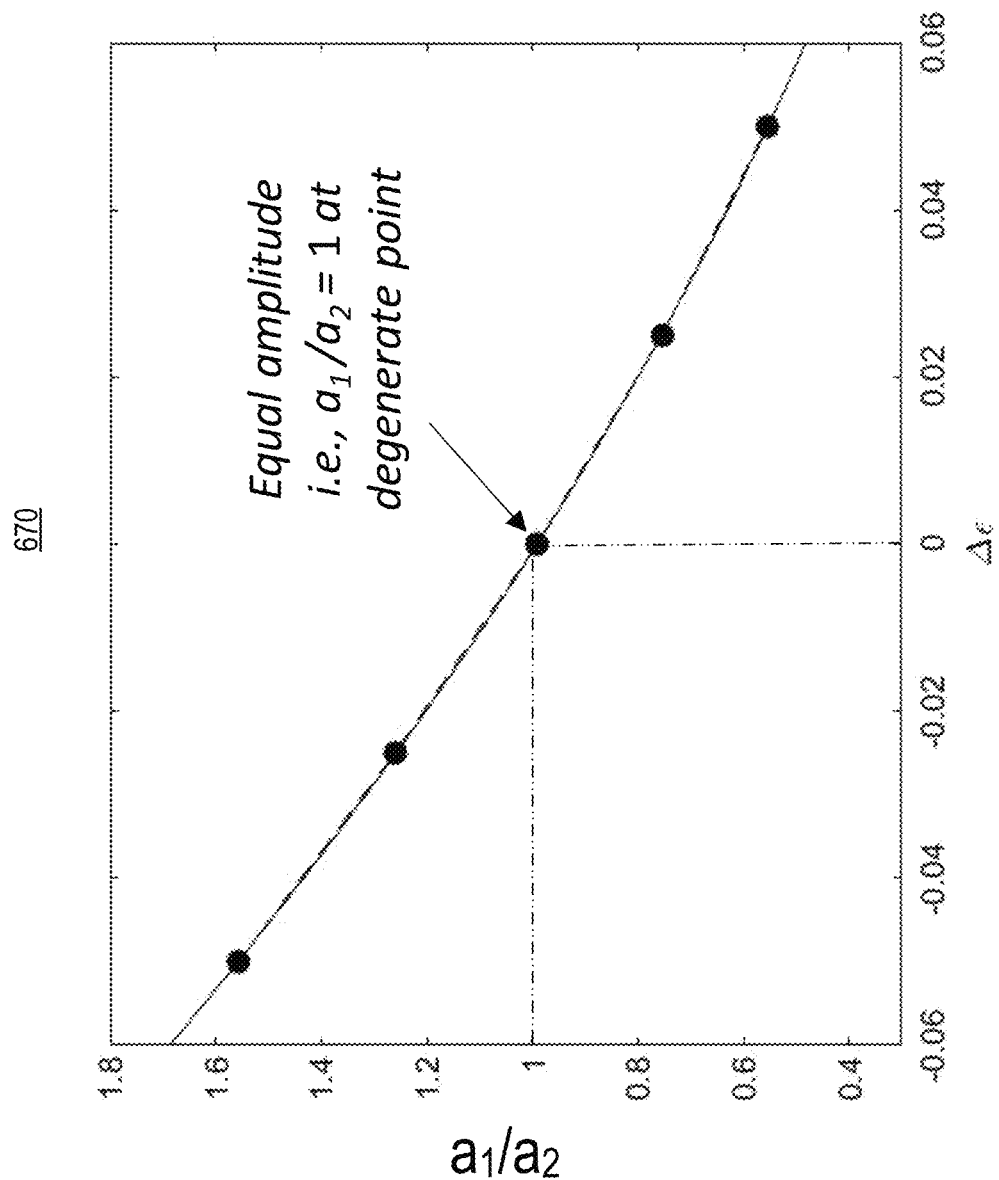
FIG. 6C illustrates variation in the side peak amplitudes of the transmission spectrum (S21) due to slight variation in the Dk of an SUT, in accordance with at least one embodiment.

FIG. 6C illustrates plot 670 depicting the effect of slight variations $\Delta\epsilon$ on the relative peak amplitude $a_1/a_2$. In at least one embodiment, variations in $\Delta\epsilon$ from −0.05 to +0.05 that constitute only ±1% change in a Dk can significantly alter relative peak amplitude $a_1/a_2$ from 1.55 to 0.55 that can cause CDCS to be highly suitable for ultrasensitive Dk sensing in the vicinity of $\epsilon_{dg}$. In at least one embodiment, sensitivity of CDCS in terms of variation in $a_1/a_2$ due to a slight variation $\Delta\epsilon$ can be represented as $$d(a_1/a_2)/d(\Delta\epsilon) = 52.0640\Delta\epsilon - 10.04$$

Figure 7A:
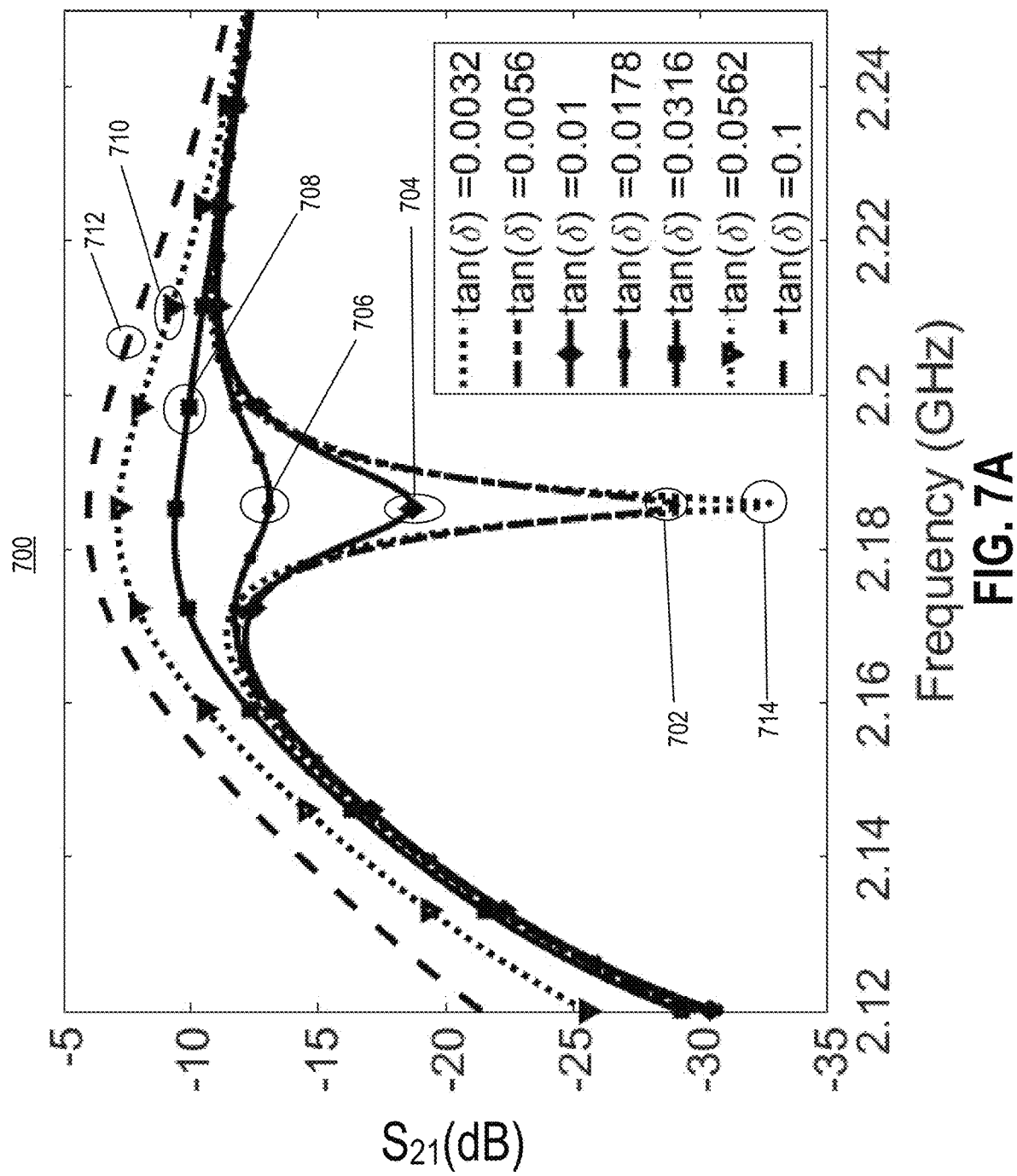
FIG. 7A illustrates transmission characteristics (S21) of a CDCS at the degenerate EIT band splitting point due to a slight variation in the loss tangent of an SUT, when the Dk of the SUT is equal to the degenerate Dk, in accordance with at least one embodiment.

FIG. 7A illustrates plot 700 showing results for transmission coefficient (S21) spectrums 702, 704, 706, 708, 710, 712, and 714 of CDCS at different loss tangent tan (δ) values which are slightly away from the degenerate loss tangent value. In FIG. 7A, a slight variation in tan (δ) substantially changes the magnitude of a split in the EIT band. In at least one embodiment, as tan (δ) increases, destructive interference between EIT bands becomes weaker that may result in a shallow split within the degenerate EIT band. This feature of CDCS can enable precise detection of the CDC of an SUT, in accordance with at least one embodiment.

Figure 7B:
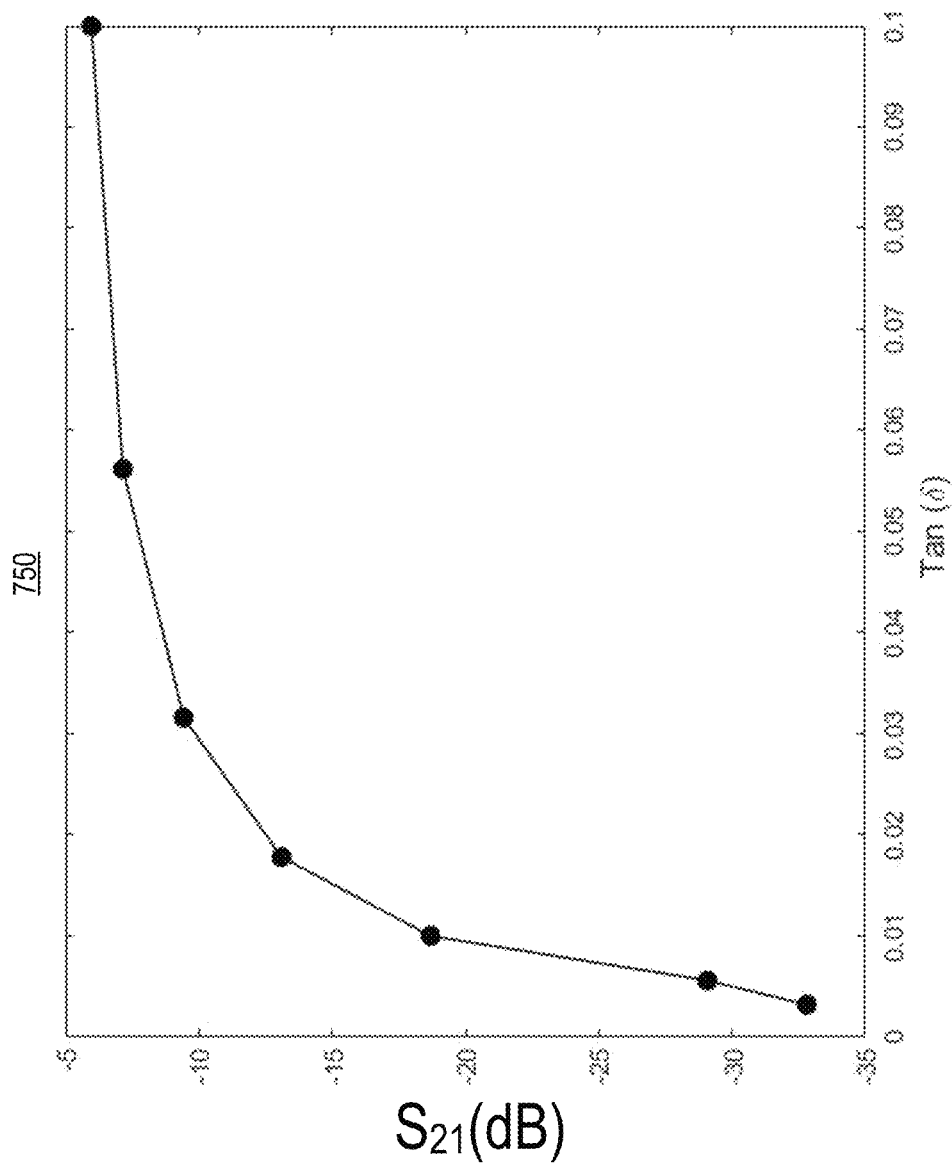
FIG. 7B illustrates variation in the side peak amplitudes of the transmission spectrum (S21) due to a slight variation in the loss tangent of an SUT when the Dk of an SUT is equal to the degenerate Dk, in accordance with at least one embodiment.

FIG. 7B illustrates plot 750 that depicts the effect of slight variations in tan(δ) on magnitude of dip in the transmission spectrum (S21) of CDCS. In an example embodiment, variations in tan (δ) can vary from $3.2 \times 10^{-3}$ to $10^{-1}$ that can significantly alter the magnitude of a dip in the degenerate region from −32.8 dB to −6 dB that makes CDCS highly suitable for ultrasensitive CDC sensing in the vicinity of $\epsilon_{dg}$.

Figure 8:
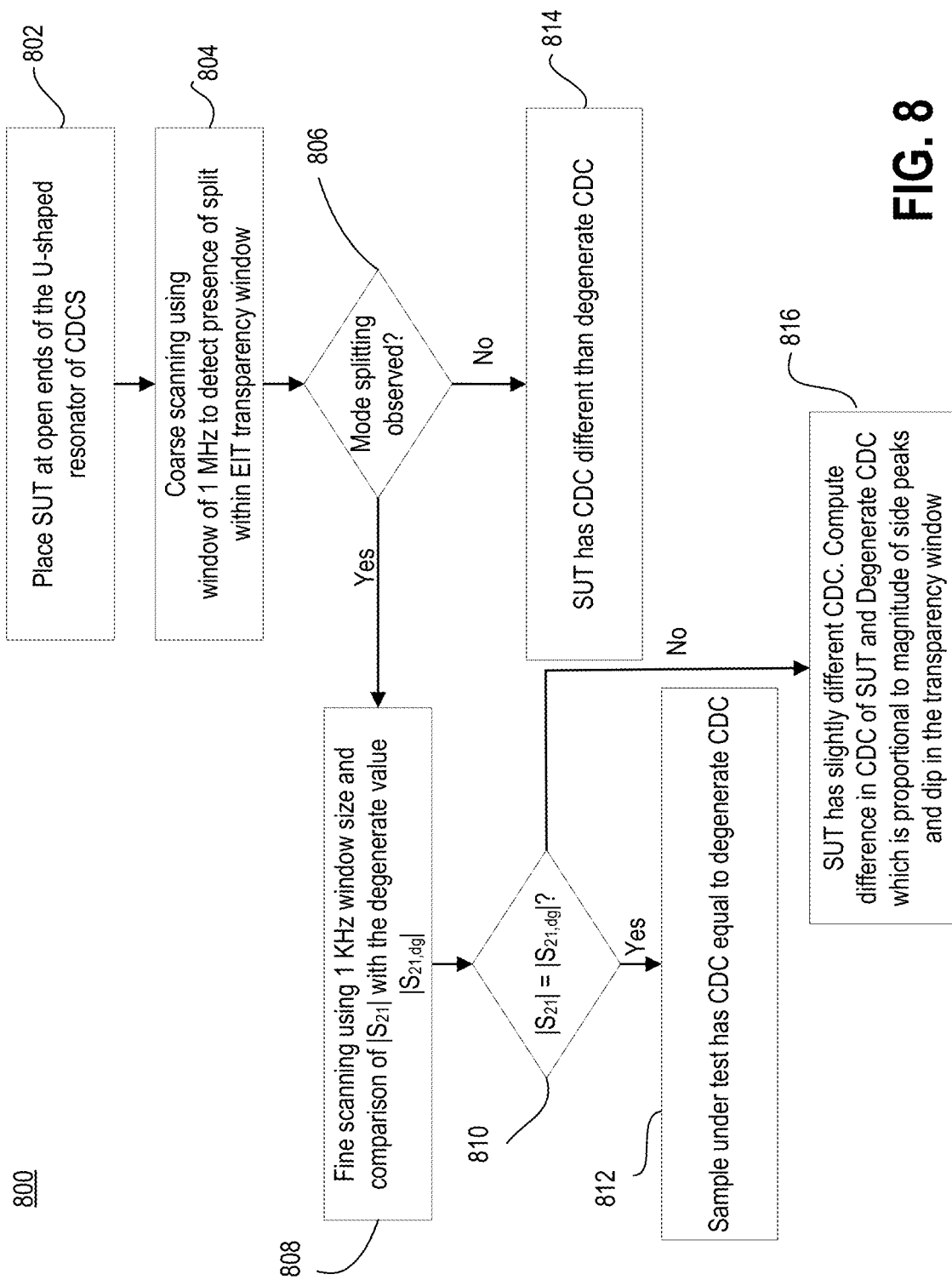
FIG. 8 illustrates a flowchart of a CDC sensing method that determines whether the CDC of an SUT is approximately equal, within a certain tolerance, to the degenerate CDC or not, in accordance with at least one embodiment.

FIG. 8 illustrates flowchart 800 of a CDC sensing method that determines whether the CDC of an SUT is the same, within a certain tolerance, as that of the degenerate mode splitting EIT or not, in accordance with at least one embodiment. While blocks are shown in a particular order, order can be modified. For example, some blocks may be performed before others and some blocks may be performed together or simultaneously. Blocks of flowchart 800 may be performed in hardware, software, or a combination of them.

In at least one embodiment, the magnitude of split in the EIT resonance band is used to quantize the difference of a CDC between an SUT and a degenerate CDC that is placed at the open ends of a U-shaped resonator. In at least one embodiment, at block 802, SUT 106 is placed on a U-shaped resonator structure of CDCS 160 mounted on the top of stubs as shown in FIG. 5A.

In at least one embodiment, at block 804, presence or absence of a mode split within EIT transparency window is detected by coarse scanning dual EIT bands with a frequency step size $\Delta f_{coarse}$ (e.g., 1 MHz). In at least one embodiment, a large step size is used to reduce scanning time in the bandwidth of interest. In at least one embodiment, step size of 1 MHz and frequency of interest 1.5 GHz to 3.5 GHz are example use cases and may be changed as needed. In at least one embodiment, at block 806, if it is determined that an EIT mode split does not exist, then at block 814 the conclusion is that SUT 106 has a different CDC as compared to the degenerate CDC. In at least one embodiment, if the split is detected at block 806, then the next processing starts at block 808. In at least one embodiment, magnitude and frequency of side peaks and split in the EIT band is quantized by the fine scanning step of $\Delta f_{fine}$ (e.g., 10 KHz) at block 808 and the magnitude of transmission spectrum |S21| is compared to the magnitude of the transmission spectrum at the degenerate CDC value $|S_{21,dg}|$.

In at least one embodiment, scanning window at block 808 may be limited to that frequency window in which the mode split is detected, and this significantly reduces the total scan time even with a smaller frequency step. In at least one embodiment, if the magnitude of a transmission spectrum is the same as that of the degenerate transmission spectrum at block 810, SUT 106 can have an equivalent CDC as that of the degenerate CDC at block 812. In at least one embodiment, if the magnitude of S21 is different than that of the degenerate value $|S_{21,dg}|$, the difference in magnitude of side peaks and the dip in the transparency window of an SUT and the degenerate CDC may be computed at block 816 which may be proportional to a difference in the CDC of an SUT and the degenerate CDC.

Figure 9:
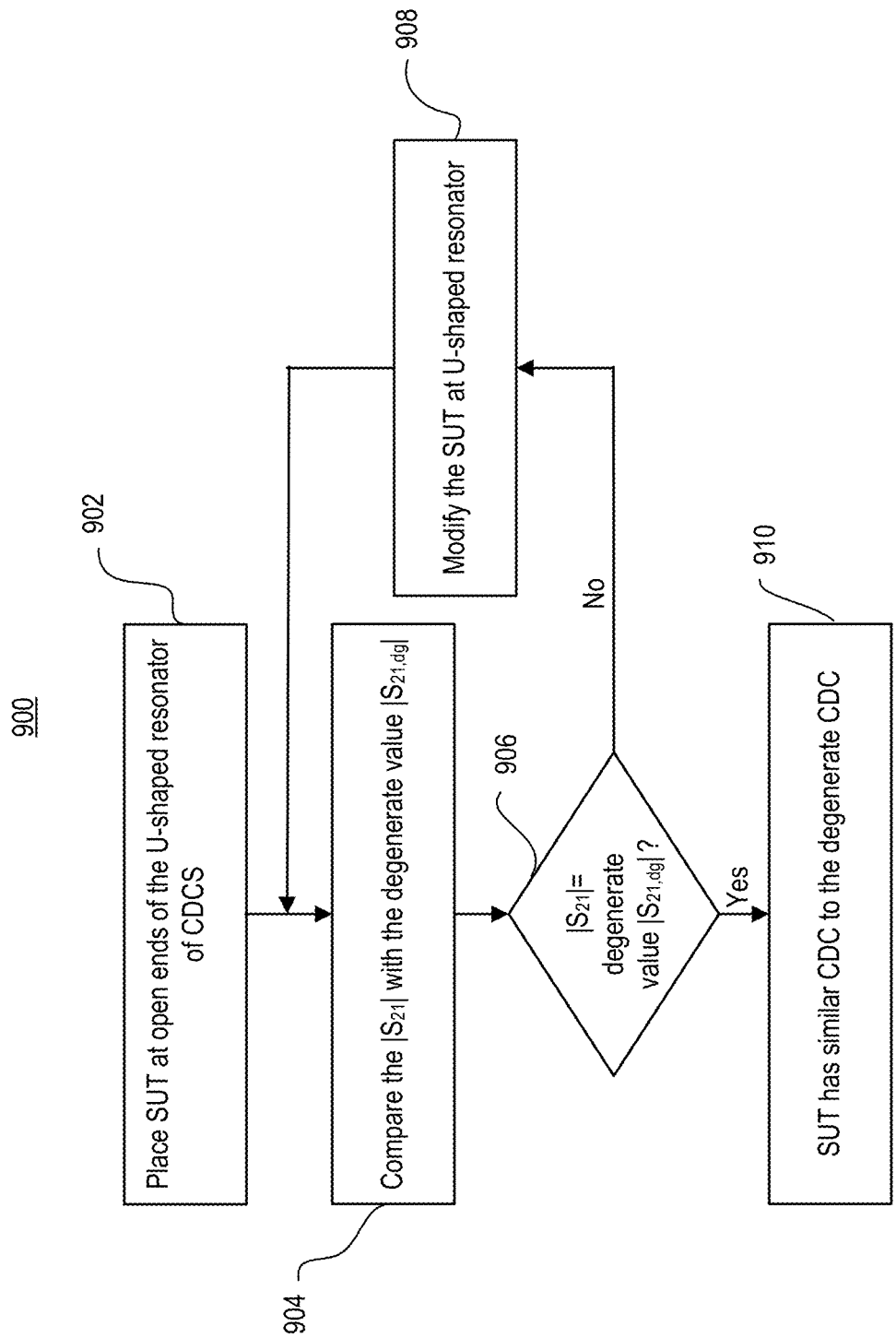
FIG. 9 illustrates a flowchart of a CDC characterization method of FIG. 5A to characterize the value of the CDC of an SUT according to the known reference degenerate CDC, in accordance with at least one embodiment.

FIG. 9 illustrates flowchart 900 of a CDC sensing method of FIG. 5A to characterized the CDC of an SUT with the known reference CDC, in accordance with at least one embodiment. While blocks are shown in a particular order, order can be modified. For example, some blocks may be performed before others and some blocks may be performed together or simultaneously. Blocks of flowchart 900 may be performed by hardware, software, or a combination of them.

In at least one embodiment, at block 902, SUT 106 is placed on top of stubs of U-shaped resonator structure of a CDCS. In at least one embodiment, at block 904, magnitude of $S_{21}$ 906 is compared with the corresponding magnitude in case of reference degenerate CDC. In at least one embodiment, magnitude of side peaks surrounding the dip within the degenerate EIT band may be a function of a difference in the Dk values of an SUT 106 and a reference CDC. In at least one embodiment, the magnitude of dip within degenerate EIT band may be a function of a difference in tan (δ) values of SUT 106 and the reference CDC. In at least one embodiment, if Dk or tan (δ) or both of SUT are the same as that of the corresponding Dk and tan (δ) of degenerate CDC based on the comparison of magnitude of $S_{21}$ with $S_{21,dg}$ at block 906, CDCS can generate a sharp mode splitting resonance within the degenerate EIT resonance; as a result, the SUT may have approximately the same CDC as that of the reference degenerate CDC determined at block 910. In at least one embodiment, if Dk or tan (δ) or both of SUT are not the same as the corresponding Dk and tan (δ) of the degenerate CDC based on the comparison of magnitude of $S_{21}$ with $S_{21,dg}$ at block 906, then SUT 106 that need to be modified and SUT with different dielectric constant is placed block 908; and the magnitude of $S_{21}$ 904 is compared with the degenerate value $|S_{21,dg}|$ again at block 904. In at least one embodiment, blocks 904 and 908 are iterated until the magnitudes of $S_{21}$ and $S_{21,dg}$ become same. In at least one embodiment, CDC of SUT 106 may be approximately the same as of that reference degenerate CDC at which mode splitting is observed within the degenerate EIT band.

Here, "device" may generally refer to an apparatus according to context of usage of that term. In at least one embodiment, a device may refer to a stack of layers or structures, a single structure or layer, a connection of various structures having active and/or passive elements, etc. Generally, a device is a three-dimensional structure with a plane along x-y direction and a height along z direction of an x-y-z Cartesian coordinate system. In at least one embodiment, plane of device may also be plane of an apparatus, which comprises device.

Throughout specification, and in claims, "connected" may generally refer to a direct connection, such as electrical, mechanical, or magnetic connection between things that are connected, without any intermediary devices.

Here, "coupled" may generally refer to a direct or indirect connection, such as a direct electrical, mechanical, or magnetic connection between things that are connected or an indirect connection, through one or more passive or active intermediary devices.

Here, "adjacent" may generally refer to a position of a thing being next to (e.g., immediately next to or close to with one or more things between them) or adjoining another thing (e.g., abutting it).

Here, "circuit" or "module" may generally refer to one or more passive and/or active components that are arranged to cooperate with one another to provide a desired function.

Here, "signal" may generally refer to at least one current signal, voltage signal, magnetic signal, or data/clock signal.

Here, meaning of "a," "an," and "the" include plural references. Here, meaning of "in" includes "in" and "on."

Here, "analog signal" generally refers to any continuous signal for which time varying feature (variable) of signal is a representation of some other time varying quantity, e.g., analogous to another time varying signal.

Here, "digital signal" may generally refer to a physical signal that is a representation of a sequence of discrete values (a quantified discrete-time signal), for example of an arbitrary bit stream, or of a digitized (sampled and analog-to-digital converted) analog signal.

Here, "scaling" may generally refer to converting a design (schematic and layout) from one process technology to another process technology and subsequently being reduced in layout area. Here, "scaling" may generally refer to downsizing layout and devices within same technology node. Here, "scaling" may also generally refer to adjusting (e.g., slowing down or speeding up—e.g., scaling down, or scaling up respectively) of a signal frequency relative to another parameter, for example, power supply level.

Here, terms "substantially," "close," "approximately," "near," and "about," generally refer to being within +/−10% of a target value. For example, unless otherwise specified in explicit context of their use, terms "substantially equal," "about equal" and "approximately equal" mean that there is no more than incidental variation between among things so described. In at least one embodiment, such variation is typically no more than +/−10% of a predetermined target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

For purposes of present disclosure, phrases "A and/or B" and "A or B" mean (A), (B), or (A and B). In at least one embodiment, phrase "A, B, and/or C" means (A), (B), (C), (A and B), (A and C), (B and C), or (A, B and C).

Here, "left," "right," "front," "back," "top," "bottom," "over," "under," and like in description and in claims, if any, are used for descriptive purposes and not necessarily for describing permanent relative positions. In at least one embodiment, "over," "under," "front side," "back side," "top," "bottom," "over," "under," and "on" as used herein refer to a relative position of one component, structure, or material with respect to other referenced components, structures or materials within a device, where such physical relationships are noteworthy. In at least one embodiment, these terms are employed herein for descriptive purposes only and predominantly within context of a device z-axis and therefore may be relative to an orientation of a device. In at least one embodiment, a first material "over" a second material in context of a figure provided herein may also be "under" second material if device is oriented upside-down relative to context of figure provided. In context of materials, one material disposed over or under another may be directly in contact or may have one or more intervening materials. Moreover, one material disposed between two materials may be directly in contact with two layers or may have one or more intervening layers. In at least one embodiment, a first material "on" a second material is in direct contact with that second material. Similar distinctions are to be made in context of component assemblies.

Here, "between" may be employed in context of z-axis, x-axis, or y-axis of a device. In at least one embodiment, a material that is between two other materials may be in contact with one or both of those materials, or may be separated from both of other two materials by one or more intervening materials. In at least one embodiment, a material "between" two other materials may therefore be in contact with either of other two materials, or may be coupled to other two materials through an intervening material. In at least one embodiment, a device that is between two other devices may be directly connected to one or both of those devices, or may be separated from both of other two devices by one or more intervening devices.

Reference in specification to "an embodiment," "one embodiment," "in at least one embodiment," "some embodiments," or "other embodiments" means that a particular feature, structure, or characteristic described in connection with embodiments is included in at least some embodiments, but not necessarily all embodiments. Various appearances of "an embodiment," "one embodiment," "in at least one embodiment," or "some embodiments" are not necessarily all referring to same embodiments. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Furthermore, particular features, structures, functions, or characteristics may be combined in any suitable manner in one or more embodiments. For example, a first embodiment may be combined with a second embodiment anywhere particular features, structures, functions, or characteristics associated with two embodiments are not mutually exclusive.

While at least one embodiment has been described in conjunction with specific embodiments thereof, many alternatives, modifications and variations of such embodiments will be apparent to those of ordinary skill in the art considering description herein. At least one embodiment is intended to embrace all such alternatives, modifications, and variations as to fall within broad scope of appended claims.

In addition, well-known power/ground connections to integrated circuit (IC) chips and other components may or may not be shown within presented figures, for simplicity of illustration and discussion, and so as not to obscure any embodiment. Further, arrangements may be shown in block diagram form to avoid obscuring any embodiment, and in view of the fact that specifics with respect to implementation of such block diagram arrangements are highly dependent upon the platform within which an embodiment is to be implemented (e.g., such specifics should be well within purview of one skilled in art). Where specific details (e.g., circuits) are set forth to describe example embodiments of disclosure, it should be apparent to one skilled in art that disclosure can be practiced without, or with variation of, these specific details. Description of an embodiment is thus to be regarded as illustrative instead of limiting.

In at least one embodiment, structures described herein can also be described as method(s) of forming those structures or apparatuses, and method(s) of operation of these structures or apparatuses. Following examples are provided that illustrate at least one embodiment. An example can be combined with any other example. As such, at least one embodiment can be combined with at least another embodiment without changing scope of an embodiment.

Example 1 is an apparatus comprising: a transmission line comprising a rectangular-shaped microstrip; a first resonator coupled in a perpendicular position relative to the transmission line; a second resonator comprising of two symmetric and rectangular-shaped body sections with substantially equal width and length, placed substantially in a middle of the transmission line and in a mirror position relative to the first resonator; and a region for a sample-under-test, wherein the region is coupled to the first resonator.

Example 2 is an apparatus according to any examples herein, in particular example 1, wherein the first resonator comprises an open circuit vertical U-shaped resonator.

Example 3 is an apparatus according to any examples herein, in particular example 1, wherein the second resonator comprises a radial stub resonator.

Example 4 is an apparatus according to any examples herein, in particular example 1, wherein the first resonator and the second resonator are to generate two EIT peaks at different frequencies for complex dielectric constant and loss tangent ($\tan(\delta)$) sensing.

Example 5 is an apparatus according to any examples herein, in particular example 1, wherein the first resonator and the second resonator are to generate a mode splitting within a degenerate electromagnetically induced transparency band, wherein to generate the mode splitting, a complex dielectric constant of the sample-under-test is to substantially match a specific value.

Example 6 is an apparatus according to any examples herein, in particular example 1, wherein in an absence of the sample-under-test, the first resonator and the second resonator are to generate two distinct electromagnetically induced transparency based resonance fields.

Example 7 is an apparatus according to any examples herein, in particular example 1, wherein the first resonator and the second resonator are independent of calibration.

Example 8 is an apparatus according to any examples herein, in particular example 1, wherein the first resonator and second resonator are to sense a dielectric loss tangent ($\tan(\delta)$) of the sample-under-test.

Example 9 is an apparatus according to any examples herein, in particular example 1, wherein the first resonator and the second resonator are to sense a permittivity of the sample-under-test and have a linear sensitivity to a variation in side peak amplitudes ($a_1/a_2$).

Example 10 is an apparatus according to any examples herein, in particular example 1, wherein the first resonator and the second resonator have a non-linear sensitivity to a variation in a magnitude of a dip, wherein the dip is associated with mode splitting.

Example 11 is an apparatus according to any examples herein, in particular example 1, wherein the first resonator and the second resonator are on a printed circuit board.

Example 12 is an apparatus according to any examples herein, in particular example 1, further comprising: a mixer coupled to the transmission line; a first frequency synthesizer coupled to the mixer; a second frequency synthesizer coupled to the transmission line; an IR filter coupled to an output of the mixer; an analog-to-digital converter coupled to an output of the IR filter; and a processing module coupled to an output of the analog-to-digital converter.

Example 13 is method comprising: deploying a sample-under-test on a first resonator coupled to a second resonator, wherein the first resonator and the second resonator provide a first output via a transmission line; mixing the first output with an oscillator frequency to generate a second output; filtering the second output to generate an analog output; converting the analog output to a digital output; and analyzing the digital output to determine whether a complex dielectric constant of the sample-under-test is same as a degenerate complex dielectric constant that causes mode splitting.

Example 14 is a method according to any examples herein, in particular example 13, wherein analyzing the digital output comprises: determining whether electromagnetically induced transparency based resonance field from the transmission line exhibits two distinct electromagnetically induced transparency modes; and notifying that the sample-under-test has a different complex dielectric constant than the degenerate complex dielectric constant if the electromagnetically induced transparency based resonance field exhibits two distinct electromagnetically induced transparency modes.

Example 15 is a method according to any examples herein, in particular example 13, wherein analyzing the digital output comprises: determining whether electromagnetically induced transparency based resonance field from the transmission line exhibits the mode splitting within a degenerate electromagnetically induced transparency band; determining, based on exhibition of the mode splitting, a first magnitude of a first side peak in a transmission spectrum surrounding a mode splitting point; determining, based on exhibition of the mode splitting, a second magnitude of a second side peak in the transmission spectrum surrounding the mode splitting point; comparing the first magnitude with the second magnitude; and notifying, based on the comparing, if the first magnitude and the second magnitude are unequal, that the sample-under-test has a different dielectric constant than the degenerate complex dielectric constant associated with the mode splitting point.

Example 16 is a method according to any examples herein, in particular example 13, wherein analyzing the digital output comprises: determining whether electromagnetically induced transparency based resonance field from the transmission line exhibits the mode splitting within a degenerate electromagnetically induced transparency band; determining, based on exhibition of the mode splitting, a first magnitude of a dip in a transmission spectrum of the sample-under-test; determining a second magnitude of a second dip associated with the degenerate complex dielectric constant; comparing the first magnitude with the second magnitude; and notifying that the sample-under-test has a different loss tangent if the first magnitude is unequal to the second magnitude based on the comparing.

Example 17 is a method according to any examples herein, in particular example 13, wherein analyzing the digital output comprises: determining whether electromagnetically induced transparency based resonance field from the transmission line exhibits the mode splitting within a degenerate electromagnetically induced transparency band; determining a first magnitude of a first side peak in a transmission spectrum surrounding a mode splitting point; determining a second magnitude of a second side peak in the transmission spectrum surrounding the mode splitting point; determining a third magnitude of a first dip in the transmission spectrum of the sample-under-test; determining a fourth magnitude of a second dip associated with the degenerate complex dielectric constant; performing a first comparison between the first magnitude with the second magnitude; performing a second comparison the third magnitude with the fourth magnitude; and notifying, based on the first comparison and the second comparison, if the first comparison indicates that the first magnitude is substantially equal to the second magnitude and if the second comparison indicates that the third magnitude and the fourth magnitude are substantially equal, that the sample-under-test has the same complex dielectric constant as the degenerate complex dielectric constant that causes the mode splitting.

Example 18 is a method according to any examples herein, in particular example 13, wherein the first resonator comprises an open circuit vertical U-shaped resonator, and wherein the second resonator comprises a radial stub resonator.

Example 19 is a method according to any examples herein, in particular example 13, wherein the first resonator and the second resonator have a non-linear sensitivity to a variation in a magnitude of a dip, wherein the dip is associated with the mode splitting.

Example 20 is a system comprises: a transmission line comprising a rectangular-shaped microstrip; a first resonator coupled in a perpendicular position relative to the transmission line; a second resonator comprising of two symmetric and rectangular-shaped body sections with substantially equal width and length, placed substantially in a middle of the transmission line and in a mirror position relative to the first resonator; a region for a sample-under-test, wherein the region is coupled to the first resonator; a mixer coupled to the transmission line; a first frequency synthesizer coupled to the mixer; a second frequency synthesizer coupled to the transmission line; an IR filter coupled to an output of the mixer; an analog-to-digital converter coupled to an output of the IR filter; and a processing module coupled to an output of the analog-to-digital converter.

An abstract is provided that will allow reader to ascertain the nature and the gist of technical disclosure. An Abstract is submitted with an understanding that it will not be used to limit scope or meaning of claims. Following claims are hereby incorporated into detailed description, with each claim standing on its own as a separate embodiment.

We claim:

1. An apparatus comprising:
   a transmission line comprising a rectangular-shaped microstrip;
   a first resonator coupled in a perpendicular position relative to the transmission line;
   a second resonator comprising of two symmetric and rectangular-shaped body sections with substantially equal width and length, placed substantially in a middle of the transmission line and in a mirror position relative to the first resonator; and
   a region for a sample-under-test, wherein the region is coupled to the first resonator.

2. The apparatus of claim 1, wherein the first resonator comprises an open circuit vertical U-shaped resonator.

3. The apparatus of claim 1, wherein the second resonator comprises a radial stub resonator.

4. The apparatus of claim 1, wherein the first resonator and the second resonator are to generate two EIT peaks at different frequencies for complex dielectric constant and loss tangent (tan(δ)) sensing.

5. The apparatus of claim 1, wherein the first resonator and the second resonator are to generate a mode splitting within a degenerate electromagnetically induced transparency band, wherein to generate the mode splitting, a complex dielectric constant of the sample-under-test is to substantially match a specific value.

6. The apparatus of claim 1, wherein in an absence of the sample-under-test, the first resonator and the second resonator are to generate two distinct electromagnetically induced transparency based resonance fields.

7. The apparatus of claim 1, wherein the first resonator and the second resonator are independent of calibration.

8. The apparatus of claim 1, wherein the first resonator and second resonator are to sense a dielectric loss tangent (tan(δ)) of the sample-under-test.

9. The apparatus of claim 1, wherein the first resonator and the second resonator are to sense a permittivity of the sample-under-test and have a linear sensitivity to a variation in side peak amplitudes ($a_1/a_2$).

10. The apparatus of claim 1, wherein the first resonator and the second resonator have a non-linear sensitivity to a variation in a magnitude of a dip, wherein the dip is associated with mode splitting.

11. The apparatus of claim 1, wherein the first resonator and the second resonator are on a printed circuit board.

12. The apparatus of claim 1 further comprising:
    a mixer coupled to the transmission line;
    a first frequency synthesizer coupled to the mixer;
    a second frequency synthesizer coupled to the transmission line;
    an IR filter coupled to an output of the mixer;
    an analog-to-digital converter coupled to an output of the IR filter; and
    a processing module coupled to an output of the analog-to-digital converter.

13. A method comprising:
    deploying a sample-under-test on a first resonator coupled to a second resonator, wherein the first resonator and the second resonator provide a first output via a transmission line;
    mixing the first output with an oscillator frequency to generate a second output;
    filtering the second output to generate an analog output;
    converting the analog output to a digital output; and
    analyzing the digital output to determine whether a complex dielectric constant of the sample-under-test is same as a degenerate complex dielectric constant that causes mode splitting.

14. The method of claim 13, wherein analyzing the digital output comprises:
    determining whether electromagnetically induced transparency based resonance field from the transmission line exhibits two distinct electromagnetically induced transparency modes; and
    notifying that the sample-under-test has a different complex dielectric constant than the degenerate complex dielectric constant if the electromagnetically induced transparency based resonance field exhibits two distinct electromagnetically induced transparency modes.

15. The method of claim 13, wherein analyzing the digital output comprises:
    determining whether electromagnetically induced transparency based resonance field from the transmission line exhibits the mode splitting within a degenerate electromagnetically induced transparency band;
    determining, based on exhibition of the mode splitting, a first magnitude of a first side peak in a transmission spectrum surrounding a mode splitting point;
    determining, based on exhibition of the mode splitting, a second magnitude of a second side peak in the transmission spectrum surrounding the mode splitting point;
    comparing the first magnitude with the second magnitude; and
    notifying, based on the comparing, if the first magnitude and the second magnitude are unequal, that the sample-under-test has a different dielectric constant than the degenerate complex dielectric constant associated with the mode splitting point.

16. The method of claim 13, wherein analyzing the digital output comprises:
- determining whether electromagnetically induced transparency based resonance field from the transmission line exhibits the mode splitting within a degenerate electromagnetically induced transparency band;
- determining, based on exhibition of the mode splitting, a first magnitude of a dip in a transmission spectrum of the sample-under-test;
- determining a second magnitude of a second dip associated with the degenerate complex dielectric constant;
- comparing the first magnitude with the second magnitude; and
- notifying that the sample-under-test has a different loss tangent if the first magnitude is unequal to the second magnitude based on the comparing.

17. The method of claim 13, wherein analyzing the digital output comprises:
- determining whether electromagnetically induced transparency based resonance field from the transmission line exhibits the mode splitting within a degenerate electromagnetically induced transparency band;
- determining a first magnitude of a first side peak in a transmission spectrum surrounding a mode splitting point;
- determining a second magnitude of a second side peak in the transmission spectrum surrounding the mode splitting point;
- determining a third magnitude of a first dip in the transmission spectrum of the sample-under-test;
- determining a fourth magnitude of a second dip associated with the degenerate complex dielectric constant;
- performing a first comparison between the first magnitude with the second magnitude;
- performing a second comparison the third magnitude with the fourth magnitude; and
- notifying, based on the first comparison and the second comparison, if the first comparison indicates that the first magnitude is substantially equal to the second magnitude and if the second comparison indicates that the third magnitude and the fourth magnitude are substantially equal, that the sample-under-test has the same complex dielectric constant as the degenerate complex dielectric constant that causes the mode splitting.

18. The method of claim 13, wherein the first resonator comprises an open circuit vertical U-shaped resonator, and wherein the second resonator comprises a radial stub resonator.

19. The method of claim 13, wherein the first resonator and the second resonator have a non-linear sensitivity to a variation in a magnitude of a dip, wherein the dip is associated with the mode splitting.

20. A system comprising:
- a transmission line comprising a rectangular-shaped microstrip;
- a first resonator coupled in a perpendicular position relative to the transmission line;
- a second resonator comprising of two symmetric and rectangular-shaped body sections with substantially equal width and length, placed substantially in a middle of the transmission line and in a mirror position relative to the first resonator;
- a region for a sample-under-test, wherein the region is coupled to the first resonator;
- a mixer coupled to the transmission line;
- a first frequency synthesizer coupled to the mixer;
- a second frequency synthesizer coupled to the transmission line;
- an IR filter coupled to an output of the mixer;
- an analog-to-digital converter coupled to an output of the IR filter; and
- a processing module coupled to an output of the analog-to-digital converter.

* * * * *